United States Patent
Hasegawa et al.

(10) Patent No.: US 10,910,167 B2
(45) Date of Patent: Feb. 2, 2021

(54) ELECTROCHEMICAL DEVICE AND METHOD FOR MANUFACTURING SAME

(71) Applicant: TDK CORPORATION, Tokyo (JP)

(72) Inventors: Hiroaki Hasegawa, Tokyo (JP); Hidetake Itoh, Tokyo (JP); Yuji Yoshino, Tokyo (JP); Kazunori Yoshikawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 26 days.

(21) Appl. No.: 16/075,199

(22) PCT Filed: Feb. 3, 2017

(86) PCT No.: PCT/JP2017/004066
§ 371 (c)(1),
(2) Date: Aug. 3, 2018

(87) PCT Pub. No.: WO2017/135437
PCT Pub. Date: Aug. 10, 2017

(65) Prior Publication Data
US 2019/0043676 A1    Feb. 7, 2019

(30) Foreign Application Priority Data
Feb. 5, 2016  (JP) ................... 2016-021066

(51) Int. Cl.
*H01G 11/12*  (2013.01)
*H01G 11/78*  (2013.01)
(Continued)

(52) U.S. Cl.
CPC ............ *H01G 11/80* (2013.01); *H01G 11/74* (2013.01); *H01G 11/84* (2013.01); *H01M 2/021* (2013.01);
(Continued)

(58) Field of Classification Search
CPC ........ H01G 11/80; H01G 11/10; H01G 11/12; H01G 11/78; H01G 11/82; H01G 11/84;
(Continued)

(56) References Cited

U.S. PATENT DOCUMENTS

2006/0222935 A1    10/2006  Takahashi et al.
2010/0246095 A1*   9/2010   Ohashi ............... H01G 9/038
                                              361/502
2014/0072869 A1*   3/2014   Hata .................. H01G 11/74
                                              429/211

FOREIGN PATENT DOCUMENTS

JP    2005-071658 A    3/2005
JP    2006-049670 A    2/2006
(Continued)

OTHER PUBLICATIONS

Apr. 11, 2017 International Search Report issued in International Patent Application No. PCT/JP2017/004066.
(Continued)

*Primary Examiner* — Arun Ramaswamy
(74) *Attorney, Agent, or Firm* — Oliff PLC

(57) ABSTRACT

An electrochemical device, which can be thin enough to be built into a thin electronic device, and a method for manufacturing the same. The electrochemical device has: an element body on which a pair of internal electrodes are laminated so as to sandwich a separator sheet; an outer sheet covering the element body; sealing parts for sealing the peripheral edge of the outer sheet so that the element body is immersed in an electrolyte solution; and lead terminals electrically connected to either one of internal electrodes and leading out from the sealing parts of the outer sheet. At least a portion of a resin tape constituting the sealing parts, from which the lead terminals lead out, is thermally fused to an
(Continued)

inside layer made from resin, which is present on the inner face of the outer sheet, in a position that does not overlap with the internal electrodes.

8 Claims, 19 Drawing Sheets

(51) Int. Cl.
- *H01G 11/80* (2013.01)
- *H01G 11/82* (2013.01)
- *H01G 11/84* (2013.01)
- *H01M 2/30* (2006.01)
- *H01M 10/0585* (2010.01)
- *H01M 2/06* (2006.01)
- *H01M 10/04* (2006.01)
- *H01M 2/02* (2006.01)
- *H01G 11/74* (2013.01)

(52) U.S. Cl.
CPC ......... *H01M 2/026* (2013.01); *H01M 2/0277* (2013.01); *H01M 2/0285* (2013.01); *H01M 2/0287* (2013.01); *H01M 2/06* (2013.01); *H01M 2/30* (2013.01); *H01M 10/04* (2013.01); *H01M 10/0436* (2013.01); *H01M 10/0585* (2013.01); *H01M 2220/30* (2013.01); *Y02E 60/13* (2013.01)

(58) Field of Classification Search
CPC ...... H01M 2/30; H01M 10/0585; H01M 2/06; H01M 10/04
USPC .......................... 361/502, 503, 517, 518, 519
See application file for complete search history.

(56) References Cited

FOREIGN PATENT DOCUMENTS

| | | |
|---|---|---|
| JP | 2006-278897 A | 10/2006 |
| JP | 2010-277925 A | 12/2010 |
| JP | 2014-110289 A | 6/2014 |
| JP | 2015-173219 A | 10/2015 |

OTHER PUBLICATIONS

Aug. 7, 2018 International Preliminary Report on Patentability issued in International Patent Application No. PCT/JP2017/004066.

* cited by examiner

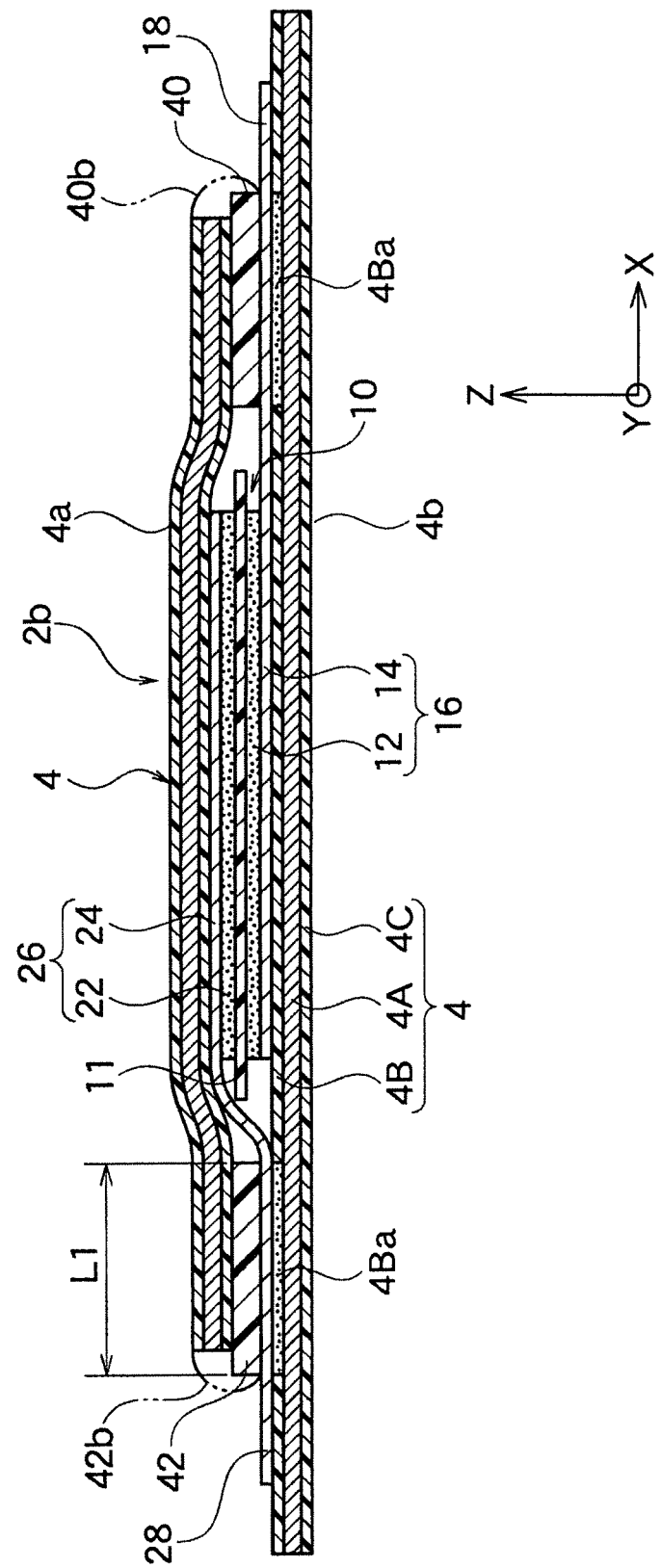

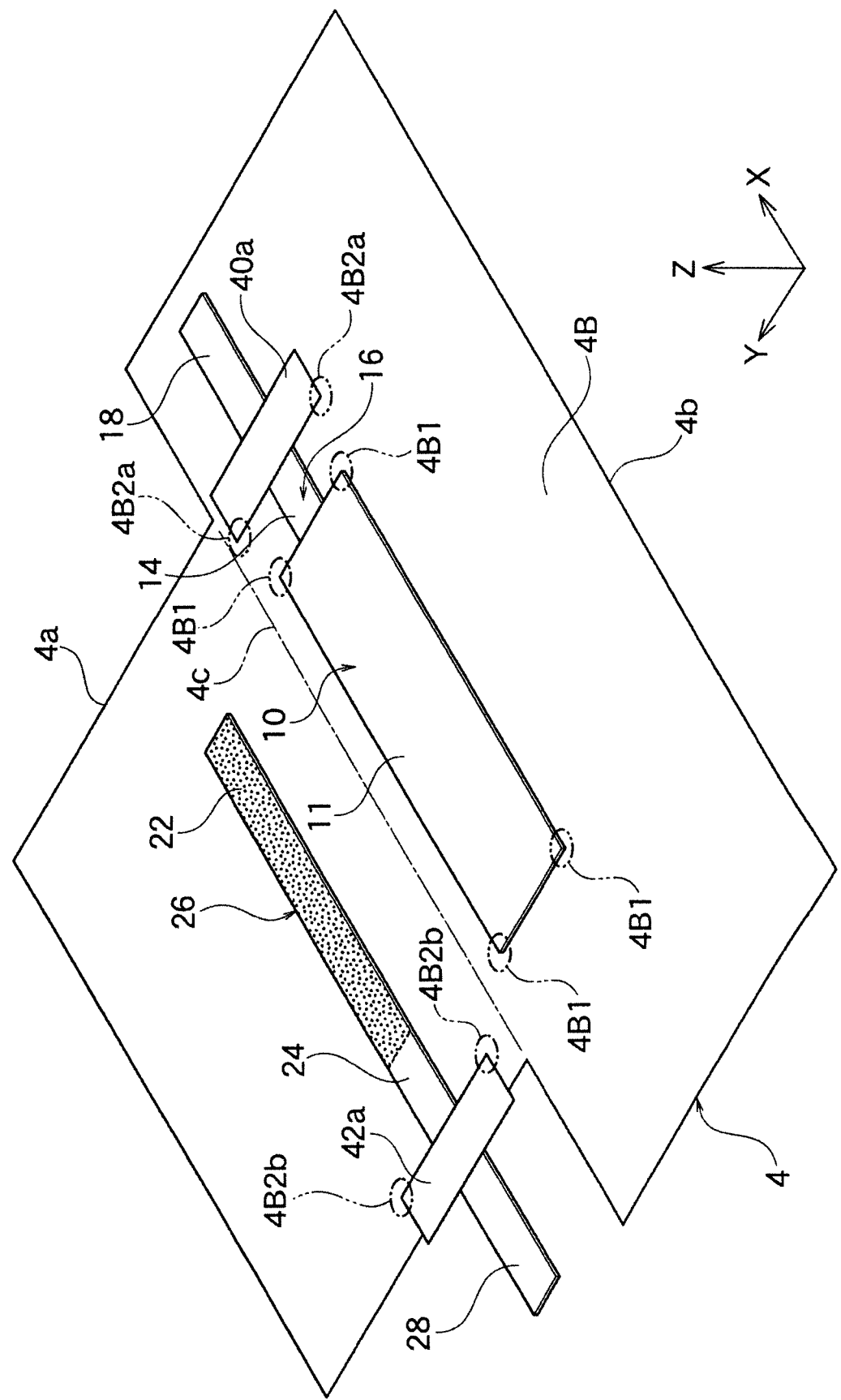

ELECTROCHEMICAL DEVICE AND METHOD FOR MANUFACTURING SAME

TECHNICAL FIELD

The present invention relates to an electrochemical device preferably used as an electric double layer capacitor (EDLC) or so, and also relates to a method of production of the electrochemical device.

BACKGROUND ART

Recently, IC card mounted with IC chip is widely used. IC card is used for various purposes such as company ID cards and membership cards or so, and also used for payment. Thus, IC card with higher functionality is in demand.

Along with attaining the higher functionality of IC card, as a battery used in a conventional IC card, a use of a primary battery having capacity as high as possible has been considered. However, in case of the primary battery, if its capacity is used up, then the IC card must be changed for new one. Hence, IC card using a chargeable secondary battery is in development.

As characteristics of the secondary battery for IC card, a thin battery of which thickness is thinner than the IC card, a compact battery capable of incorporated in the IC card, and a flexible battery which can be bend are demanded. On the other hand, IC card without a battery is also under development. it communicates using a power obtained from a card reader by a wireless power transfer.

However, a power obtained by a wireless charging is small, thus a sufficient power cannot be obtained for IC card with high functionality. Therefore, it is necessary for a secondary battery charged by the wireless charging to drive a circuit in the IC card and there is a need of the secondary battery with small charging loss, capable of charging in short period of time, and capable of charging up to a driving voltage of a circuit.

As for the conventional electrochemical device, because a power storage capacity is large, it is difficult to charge the device so that a charging voltage reaches a sufficient voltage. Therefore, there is a need of EDLC having a low capacity and adequate resistance. Here, the thickness of the device in IC card is for example 1.0 mm or less, preferably 0.9 mm or less, and more preferably 0.5 mm or less, which means it is demanded to be very thin. Also, an area for incorporating the device in the card is limited as well.

For example, a conventional EDLC disclosed in the patent document 1 or so has a stacking structure wherein a separator is placed between a pair of internal electrodes on an inner side of an exterior sheet, but the internal electrodes need to be positioned so that these are facing against each other while placing the separator between them. Thus, conventionally, the pair of internal electrodes and the separator are positioned by adhering to each other using insulation tape or so. After a positioning is done, the exterior sheet is sealed and the insulation tape for the positioning is left on the inner side of the exterior sheet. Thus, conventionally, it was thicker due to the thickness of the insulation tape for the positioning, hence it was difficult to make a thin EDLC to the sufficient level.

PRIOR ART

[Patent document 1] JP Patent Publication No. 2006-49670

SUMMARY OF INVENTION

Problem to be Solved by the Invention

The present invention was carried out in view of such circumstances, and the object thereof is to provide the electrochemical device which can be thinned to the level capable of incorporated into a thin electronic device such as IC card or so, and also relates to a method of producing the electrochemical device.

In order to attain the above mentioned object, the electrochemical device according to the first aspect of the present invention has an element main body formed by stacking a pair of internal electrodes and a separator sheet placed between the pair of internal electrodes, an exterior sheet covering the element main body, a sealing part to seal an outer edge of the exterior sheet for immersing the element main body in an electrolyte, and a lead terminal electrically connected to either one of the internal electrodes and extending to an outside from the sealing part of the exterior sheet, wherein at least part of a resin tape placed on the sealing part from which the lead terminal extends is heat bonded to an inner layer made of resin present on an inner surface of the exterior sheet at inner position not overlapping with the sealing part.

According to the first aspect of the present invention, at least part of the resin tape placed on the sealing part from which the lead terminal extends is heat bonded to the inner layer made of resin present on the inner surface of the exterior sheet at the inner position not overlapping with the sealing part. Thus, the internal electrodes connected to the lead terminal fixed with the resin tape are temporary fixed and positioned against the inner surface of the exterior sheet. Thus, the position of the pair of internal electrodes and the separator sheet placed between them can be easily determined, and thus the positioning tape is unnecessary.

That is, in the electrochemical device according to the first aspect of the present invention, the thickness of the device can be 1 mm or less, preferably 0.9 mm or less, and more preferably 0.5 mm or less while preventing a position shift between the separator and the pair of the internal electrodes on the inner side of the exterior sheet. As a result, the electrochemical device can be thinned to the level that it can be incorporated in the thin electronic device such as IC card or so.

In order to attain the above mentioned object, the electrochemical device according to the second aspect of the present invention has a first element main body having a pair of lead terminals, a second element main body having a pair of lead terminals different from that of the first element main body, a separator sheet separating the first element main body and the second element main body, an exterior sheet covering the first element main body and the second element main body separated by the separator sheet, and a sealing part to seal an outer edge of the exterior sheet for immersing the first element main body and the second element main body in an electrolyte, wherein at least part of resin tapes placed on the sealing part from which the lead terminals extend are heat bonded to an inner layer made of resin present on an inner surface of the exterior sheet at an inner position not overlapping with the sealing part.

According to the second aspect of the present invention, at least part of the resin tape placed on the sealing part from which the lead terminal extends is heat bonded to the inner layer made of resin present on the inner surface of the exterior sheet at the inner position not overlapping with the sealing part. Hence, the first element main body or the second element main body connected to the lead terminal fixed with the resin tape is temporary fixed and positioned against the inner surface of the exterior sheet. Thus, the position of the pair of internal electrodes and the separator sheet placed between them can be easily determined and thus the positioning tape is unnecessary.

That is, in the electrochemical device according to the second aspect of the present invention, a position shift between the separator sheet and the pair of the element main bodies on the inner side of the exterior sheet is effectively prevented, and the electrochemical device can be thinned to the level that it can be incorporated in the thin electronic device such as IC card or so.

Preferably, at least part of the resin tape placed on the sealing part from which the lead terminal extends is heat bonded to at least one face of the separator sheet. By constituting as such, the position of the pair of the element main bodies faced to each other with the separator sheet between them can be determined easily, and thus the positioning tape is unnecessary.

Preferably, the separator bonding part for fixing at least part of the separator sheet to the inner surface of the exterior sheet is formed on the inner layer made of resin present on the inner surface of the exterior sheet. By having such constitution, the position of the separator sheet is also determined on the inner side of the exterior sheet, and the position of the internal electrode can be determined easily, and thus the positioning tape is unnecessary also from this point.

Preferably, part of the separator sheet which does not overlap with the internal electrodes is fixed to the separator bonding part. By having such constitution, the function of the active material layer formed on the internal electrodes can be exhibited sufficiently.

Preferably, the exterior sheet has the front face part and the back face part, and at least part of the resin tape is heat bonded in a spot form on either one of the front face part or the back face part.

By constituting as such, the position of the internal electrode or the element main body fixed to the resin tape can be determined with respect to the front face part or the back face part of the exterior sheet, and the position of the internal electrode or the element main body does not shift, further the performance of the device improve. Also, there is no needs of the positioning tape, and contributes to make the device thinner.

Preferably, both of the resin tapes constituting the sealing part from which the pair of the lead terminals respectively extend are heat bonded in a spot form to the inner surface of either one of the front face part or the back face part. By constituting as such, the position of the internal electrodes or the element main body fixed to each resin tape can be determined with respect to the front face part or the back face part of the exterior sheet, and the position shift of the internal electrode or the element main body does not occur, thus the performance of the device improves. Also, there is no needs of the positioning tape, and contributes to make the device thinner.

Alternatively, either one of the resin tapes constituting the sealing part from which the pair of the lead terminals respectively extend may be heat bonded in a spot form to the inner surface of either one of the front face part or the back face part, and other one of the resin tapes constituting the sealing part from which the pair of the lead terminals respectively extend may be heat bonded in a spot form to the inner surface of other one of the front face part or the back face part.

By constituting as such, the position of the internal electrode or the element main body can be determined with respect to the front face part and the back face part of the exterior sheet, and the position of the internal electrode or the element main body does not shift, thus the performance of the device improves. Also, there is no needs of the positioning tape, and contributes to make the device thinner.

Preferably, one face of the lead terminal extending from the sealing part of the exterior sheet to the outside directly contacts with the inner layer made of the resin formed on the inner surface of the exterior sheet positioned at the sealing part.

Conventionally, it was thought that an adhesive resin attached to both surfaces of the lead terminal was necessary for avoiding a short circuit and also securing a sealing, wherein the adhesive resin corresponds to the insulation tape for constituting the sealing part. However, as a result of keen examination by the present inventors, it was found that securing the sealing and avoiding the short circuit can be both attained by attaching the insulation tape, which constitutes the sealing part and serves as the adhesive resin, only to one surface of the lead terminal, and bonding another surface of the lead terminal directly to the inner layer made of resin formed on the inner surface of the exterior sheet. As a result, while securing the sealing and avoiding the short circuit, the thickness of the sealing part which is the thickest part in sealing parts was thinned as much as possible.

That is, in this electrochemical device, the thickness of the device can be made even thinner while securing the sealing of the inside of the device and avoiding the short circuit.

Preferably, on another surface of the lead terminal extending to the outside from the sealing part of the exterior sheet, the outer edge of the exterior sheet is bonded by the adhesive resin which contacts with the inner layer made of resin formed on the inner surface of the exterior sheet, and part of the adhesive resin protrudes to the outside from the outer edge of the exterior sheet and covers the periphery of the outer edge of the exterior sheet.

As the exterior sheet, a sheet of which both faces of the metal sheet are covered with an insulation layer is preferably used. At the periphery of the outer edge of the exterior sheet, an end part of the metal sheet may be exposed, and if the exposed metal sheet contacts with the lead terminal, this causes the short circuit. In the preferable embodiment of the present invention, part of the adhesive resin constituting the sealing part protrudes from the outer edge of the exterior sheet, and the periphery of the outer edge of the exterior sheet is covered with the adhesive resin. Therefore, at the periphery of the outer edge of the exterior sheet, the end of the metal sheet constituting the exterior sheet is not exposed, hence the short circuit or so between the lead terminal and the meal sheet can be effectively prevented.

The electrochemical device of the present invention may further have a support sheet for preventing the bending of the lead terminal extending from the sealing part. By constituting as such, the bending of the lead terminal extending from the sealing part can be effectively prevented.

Preferably, the support sheet is constituted such that part of the outer edge of the exterior sheet positioned at the sealing part extends to the outside. By taking such constitution, the support sheet can be easily formed.

The length of the protrusion of the support sheet may be longer than the protrusion of the lead terminal. By taking such constitution, the bending of the lead terminal extending from the sealing part can be effectively prevented.

On the surface of the support sheet which contacts with the lead terminal extending from the sealing part, a heat resistance insulation layer may be stacked. By taking such constitution, even if heat is applied when the lead terminal and an external connection terminal are electrically connected, the short circuit between the lead terminal and the metal sheet present inside the exterior sheet can be effectively prevented.

The first method for producing the electrochemical device according to the first aspect of any one of the above mentioned present invention has steps of, partially bonding the resin tape fixed to the lead terminal of either one of the internal electrodes to the inner surface of the exterior sheet, covering an active material layer of the internal electrodes with the separator sheet, partially bonding the resin tape fixed to the lead terminal of other one of the internal electrodes to the inner surface of the exterior sheet so as to place the other one of the internal electrodes on the separator sheet, covering the element main body by the exterior sheet, and sealing the outer edge of the exterior sheet for immersing the element main body in an electrolyte.

The second method for producing the electrochemical device according to the second aspect of any one of the above mentioned present invention has steps of, partially bonding the resin tape fixed to the lead terminal of the first element main body to the inner surface of the exterior sheet, covering the first element main body by the separator sheet, partially bonding the resin tape fixed to the lead terminal of the second element main body on the inner surface of the exterior sheet or the separator sheet so as to place the second element main body on the separator sheet, covering the second element main body by the exterior sheet, and sealing the outer edge of the exterior sheet for immersing the first element main body and the second element main body in the electrolyte.

Preferably, the sealing part from which the lead terminal extend is formed by heat pressing at least part of the resin tape held by the exterior sheet, and the resin tape is partially bonded to the inner surface of the exterior sheet prior to the heat pressing.

BRIEF DESCRIPTION OF DRAWING

FIG. 2A is a schematic cross section figure along II-II line of FIG. 1A.

FIG. 5B is a perspective view corresponding to FIG. 5A showing the method of production according to other embodiment of the present invention.

DESCRIPTION OF EMBODIMENTS

Hereinafter, the present invention is described in detail based on the embodiments shown in figures.

First Embodiment

Figure 1A:
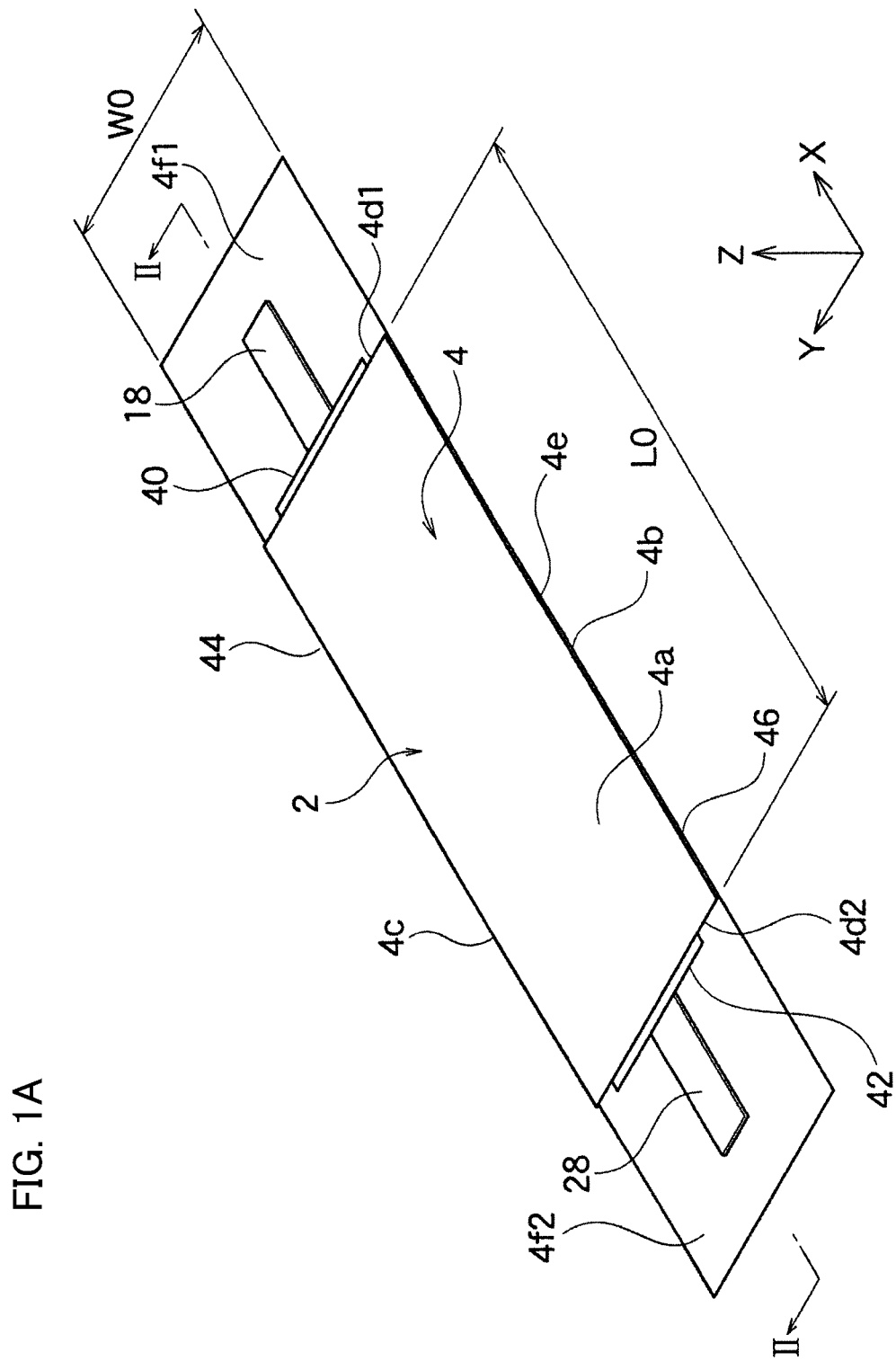
FIG. 1A is a perspective figure of an electric double layer capacitor according to an embodiment of the present invention.

As shown in FIG. 1A, the electric double layer capacitor (EDLC) 2 as the electrochemical device according to an embodiment of the present invention has the exterior sheet 4. The exterior sheet 4 has the front face 4a and the back face 4b which are made by folding one exterior sheet 4 at a folding outer edge part 4c.

In the present embodiment, the exterior sheet 4 has a rectangle shape wherein a length L0 in X axis direction is longer than a length W0 in Y axis direction. However, the shape is not limited thereto, and it may be a square shape, other polygonal shape, a circular shape, an oval shape, and other shapes or so. In this embodiment, a thickness direction (Z axis direction) is the direction in which the front face 4a and the back face 4b of the exterior sheet 4 overlap, and X axis and Y axis are perpendicular to each other.

As it is described in below using FIG. 2A, the element main body 10 is incorporated in an inner side of the exterior sheet 4. Pair of lead terminals 18 and 28 extending from the element main body 10 are placed onto the support sheets 4f1 and 4f2 at the outside of the exterior sheet 4.

As shown in FIG. 1A, in the present embodiment, the inner side of the exterior sheet 4 of rectangle shape is sealed by a first sealing part 40, a second sealing part 42, a third sealing part 44, and a fourth sealing part 46 which are formed along four sides of the exterior sheet 4.

In this embodiment, the first sealing part 40 is the part which seals an outer edge 4d1 of the exterior sheet 4 where the lead terminal 18 extends to the outside in X axis direction. Also, the second sealing part 42 is the part which seals an outer edge 4d2 of the exterior sheet 4 where the lead terminal 28 extends to the outside in X axis direction. The first sealing part 40 and the second sealing part 42 are positioned at an oppose side in X axis direction of the exterior sheet 4. Also, the third sealing part 44 is the part which seals an outer edge 4c formed by folding the exterior sheet 4; and the fourth sealing part is the part which seals an outer edge 4e of the exterior sheet 4 positioned at the opposite side of the outer edge 4c in Y axis direction.

As shown in FIG. 2A, in the inner side of the folded exterior sheet 4, the element main body 10 is incorporated. The element main body 10 has a constitution of the electric double layer capacitor, and in the present embodiment, a single capacitor element (one element main body) is placed on the inner side of the folded exterior sheet 4.

In the element main body 10, a pair of first internal electrode 16 and second internal electrode 26 are stacked so that a separator sheet 11 infiltrated with the electrolyte is placed between them. Either one of the first internal electrode 16 and the second internal electrode 26 is a positive electrode, and other one is a negative electrode, but their constitution is the same. These first internal electrode 16 and second internal electrode 26 respectively have a first active material layer 12 and a second active material layer 22 which are stacked so that the first active material layer 12 and the second active material layer 22 respectively contact with one surface and the other surface of the separator sheet 11. Also, the first internal electrode 16 and the second internal electrode 26 respectively have a first collector layer 14 and a second collector layer 24 which are stacked so that the first collector layer 14 and the second collector layer 24 respectively contact with the first active material layer 12 and the second active material layer 22.

The separator sheet 11 electrically insulates the internal electrodes 16 and 26, and it is constituted so that the electrolyte can be infiltrated into it, and for example it is constituted by a porous sheet having an electric insulation property. As the porous sheet having the electric insulation property, a single layer or a multilayer film made of polyethylene, polypropylene, or polyolefin; a stretchable film made of mixture of the above mentioned resins or so; or an unwoven felt made of material at least one selected from the group consisting of cellulose, polyester, and polypropylene or so may be exemplified. The thickness of the separator sheet 11 is for example about 5 to 50 μm.

The collector layers 14 and 24 are not particularly limited as long as these are made of the material having high conductivity in general. Preferably, a metal material having a low electric resistance is used, and for example a sheet of copper, aluminum, and nickel or so is used. Thickness of each of the collector layers 14 and 24 is for example about 15 to 100 μm.

The active material layers 12 and 22 include an active material and a binder, and preferably include a conductive auxiliary agent. The active material layers 12 and 22 are stacked on the surface of the collector layers 14 and 24 respectively.

As the active material, various porous materials having an electron conductivity may be exemplified, and for example carbon materials such as activated carbon, natural graphite, artificial graphite, mesocarbon microbeads, mesocarbon fiber (MCF), cokes, glass form carbon, and organic compound fired material or so may be mentioned. As the binder, it is not particularly limited as long as the above mentioned active material and preferably the conductive auxiliary agent can be fixed to the sheet constituting the collector layer, and various binders can be used. As the binder, for example fluoride resins such as polyvinylidene fluoride (PVDF) and polytetrafluoroethylene (PTFE) or so, and a mixture between styrene-butadiene rubber (SBR) and aqueous polymer (carboxymethyl cellulose, polyvinyl alcohol, sodium polyacrylate, dextrin, gluten or so) may be exemplified.

The conductive auxiliary agent is a material added to enhance the electron conductivity of the active material layers 12 and 22. As the conductive auxiliary agent, for example carbon materials such as carbon black, acetylene black or so, metal fine powders such as copper, nickel, stainless steel, iron or so, a mixture between the carbon material and the metal fine powders, and conductive oxides such as ITO or so may be exemplified.

The thickness of each of the active material layers 12 and 22 is preferably about 1 to 100 μm. The active material layers 12 and 22 are formed on the first collector layer 14 and second collector layer 24 respectively. An area of active material layers 12 and 22 is same or smaller than the separator layer 11. The active material layers 12 and 22 can be formed by known methods.

In the present embodiment, "the positive electrode" corresponds to the electrode which attracts anions in the electrolyte when the voltage is applied to the electric double layer capacitor; and "the negative electrode" corresponds to the electrode which attracts cations in the electrolyte when the voltage is applied to the electric double layer capacitor. Note that, in case of recharging after once charging the electric double layer capacitor by applying the voltage in a specific positive-negative direction, usually the recharging is done in the same direction as the first time, and the voltage in the opposite direction is rarely applied for charging.

The exterior sheet 4 is made of the material which does not allow the electrolyte to pass through, and is preferably made of the material so that the outer edges of the exterior sheet 4 are heat bonded with each other and the exterior sheet 4 is heat bonded with the sealing tape 40a (hereafter, 42a may be included) as shown in FIG. 5. This sealing tape 40a preferably is constituted by the resin tape, and has adhesiveness such as an adhesive tape or so from the point of workability. Note that, it is not limited to a tape, and it may be any form as long as it can be bonded by melting with heat such as a sealant resin which can be coated.

Also, the exterior sheet 4 seals the element main body 10, and it is constituted by those which can prevent air and water from entering the inner side of the exterior sheet 4. Specifically, the exterior sheet 4 may be a single layer sheet. Preferably, as shown in FIG. 2A, it is a multilayered sheet wherein the metal sheet 4A, the inner layer 4B, and the outer layer 4C are stacked so that the metal sheet 4A is placed between the inner layer 4B and the outer layer 4C.

The metal sheet 4A is preferably constituted for example by stainless steel or so. The inner layer 4B is preferably constituted by an electric insulation material such as polypropylene which hardly reacts with the electrolyte and capable of heat sealing. Also, the outer layer 4C is not particularly limited, and for example it is constituted by PET, PC, PES, PEN, PI, fluorine resin, PE, polybutylene-terephthalate (PBT) or so. The thickness of the exterior sheet 4 is preferably 5 to 80 μm.

In the present embodiment, a proof stress of the exterior sheet is 390 to 1275 N/mm$^2$, and preferably 785 to 980 N/mm$^2$ according to JIS Z2241. Also, a hardness of the exterior sheet is 230 to 480, and preferably 280 to 380 in terms of Vickers hardness (Hv) (JIS 2244). From such point, the metal sheet 4A of the exterior sheet 4 is preferably a stainless steel SUS304 (BA), SUS304(½H), SUS304(½H), SUS304 H, SUS301 BA, SUS301 (½H), and SUS301 (¾H).

The lead terminals 18 and 28 are the conductive members which function as an input and output terminal of the current to the collector layers 14 and 24, and the lead terminals 18 and 28 have a rectangular plate shape. In the present embodiment, the lead terminals 18 and 28 are integrated with the conductive sheets constituting the collector layers 14 and 24 respectively; and the thickness of the lead terminals 18 and 28 may be same as the collector layers 14 and 24. Note that, the lead terminals 18 and 28 may be formed separately from the collector layers 14 and 24, and may be electrically connected with the collector layers 14 and 24. In this case, the thickness of the lead terminals 18 and 28 may be different from the collector layers 14 and 24, and for example it may be 20 to 100 μm or so.

A space formed between the exterior sheet 4 and used for sealing the element main body 10 by the sealing parts 40, 42, 44 and 46, is filled with the electrolyte (not shown in the figure), part of which is impregnated in the active material layers 12 and 22, and in the separator sheet 11.

As the electrolyte, an organic solvent in which electrolyte salt is dissolved is used. As the electrolyte salt, for example, quaternary ammonium salt such as tetraethylammoniumtet-rafluoroborate (TEA$^+$BF$^{4-}$) and triethylmethylammonium tetrafluoroborate (TEMA$^+$BF$^{4-}$) or so, ammonium salt, amine salt, and amidine salt or so is preferably used. Note that, as these electrolytes, one kind may be used alone, or two or more kinds may be used together.

Also, as the organic solvent, known solvents can be used. As the organic solvents, for example propylene carbonate, ethylene carbonate, dimethyl carbonate, methylethyl carbonate, diethyl carbonate, γ-butylolactone, dimethylformamide, sulfolane, acetonitrile, propionitrile, methoxyacetonitrile or so may be exemplified. These may be used alone, or by mixing two or more thereof in arbitrary ratio.

As shown in FIG. 2A, tips of the lead terminals 18 and 28 respectively pass through the first sealing part 40 and the second sealing part 42, and extend to the outside of the first sealing part 40 and the second sealing part 42. The first sealing part 40 and the second sealing part 42 are the parts where lead terminals 18 and 28 extends to the outside respectively, and compared to the third sealing part 44 and the fourth sealing part 46, high sealing performance is particularly needed for the first sealing part 40 and the second sealing part 42.

Figure 3:
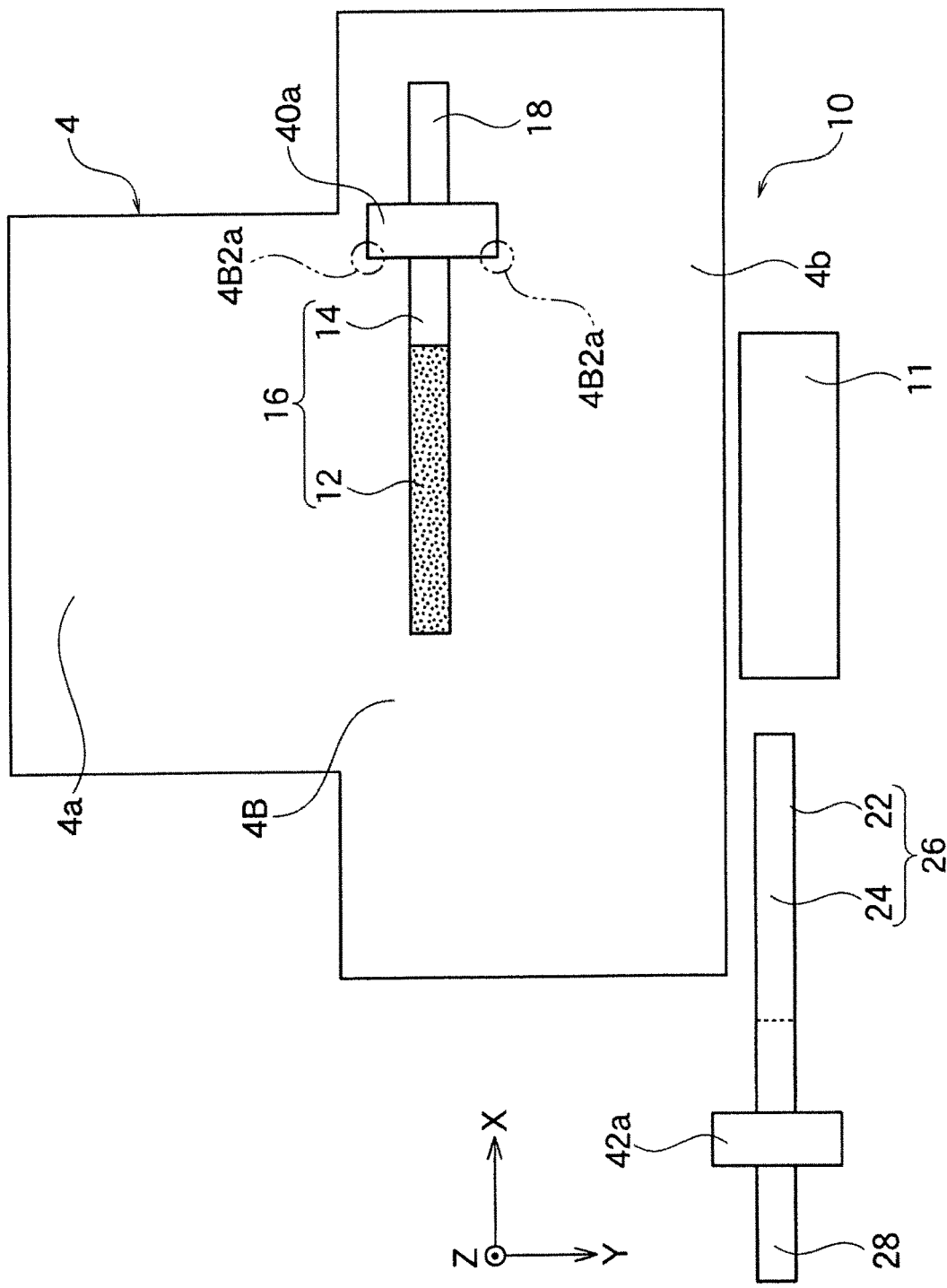
FIG. 3 is a schematic prospective figure showing an example of the method of producing the electric double layer capacitor shown in FIG. 1.

The width in Y axis direction of the lead terminals 18 and 28 shown in FIG. 3 and FIG. 4 may be same or different from each other. Also, in case these lead terminals 18 and 28 are integrally formed with the collector layers 14 and 24 respectively, the width in Y axis direction of the lead terminals 18 and 28 may be about the same as width W1 in the Y axis direction of the collector layers 14 and 24 (see FIG. 4), but it may be smaller or larger than the width W1.

The width W1 in Y axis direction of the collector layers 14 and 24 is preferably 2 to 10 mm, and it is preferably smaller than width W3 in Y axis direction of the separator sheet 11. The difference between W3 and W1 is preferably 0.2 to 2 mm. The collector layers 14 and 24 are preferably placed at a center of Y axis direction of the separator sheet 11.

Also, the width W0 in Y axis direction of EDLC2 shown in FIG. 1 is preferably 10 to 50 mm in case it is housed in IC card, and the length L0 in X axis direction of EDLC2 excluding the lead terminals 18 and 28 is preferably 10 to 50 mm.

Figure 5A:
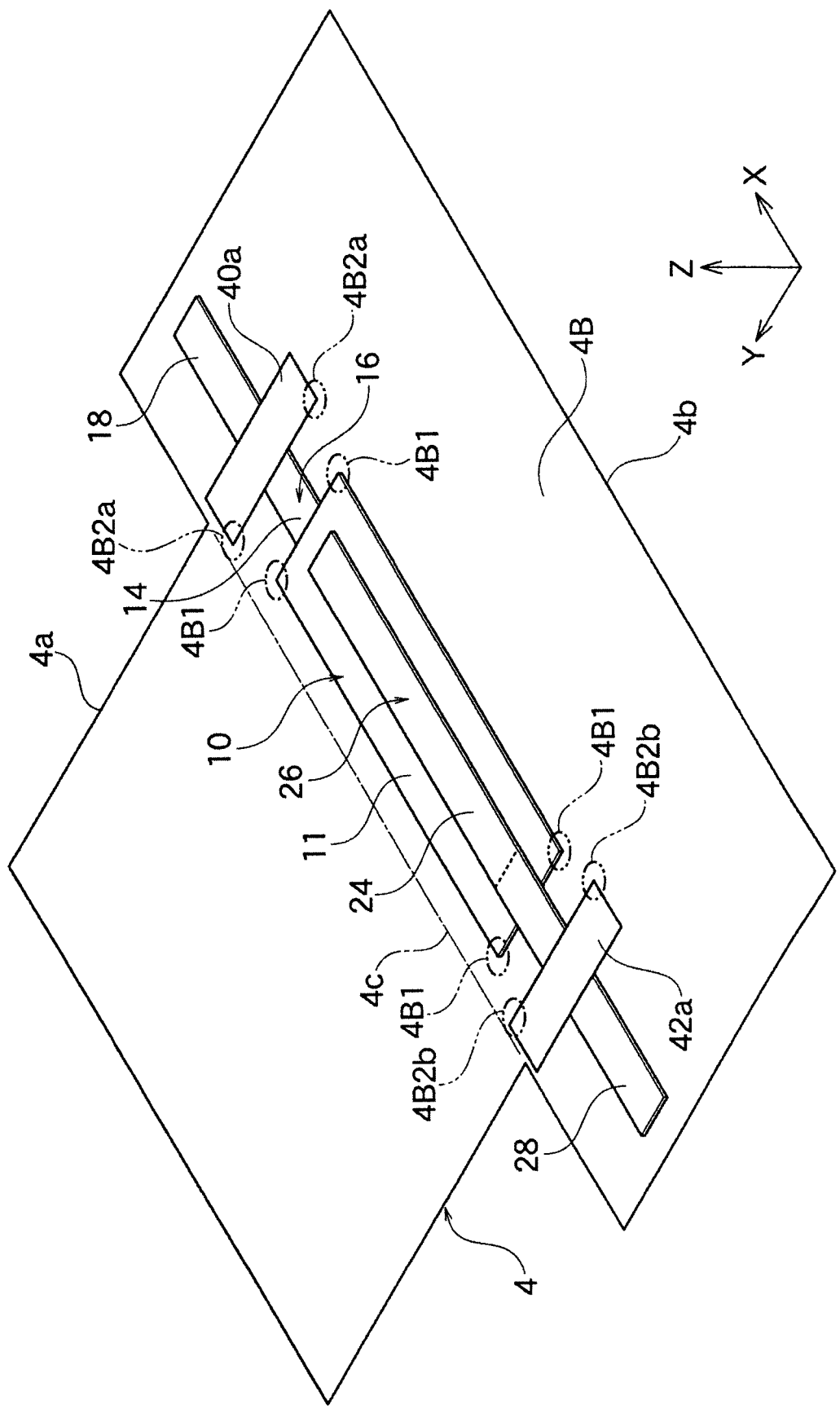
FIG. 5A is a perspective figure showing a step following FIG. 4B.
Figure 6:
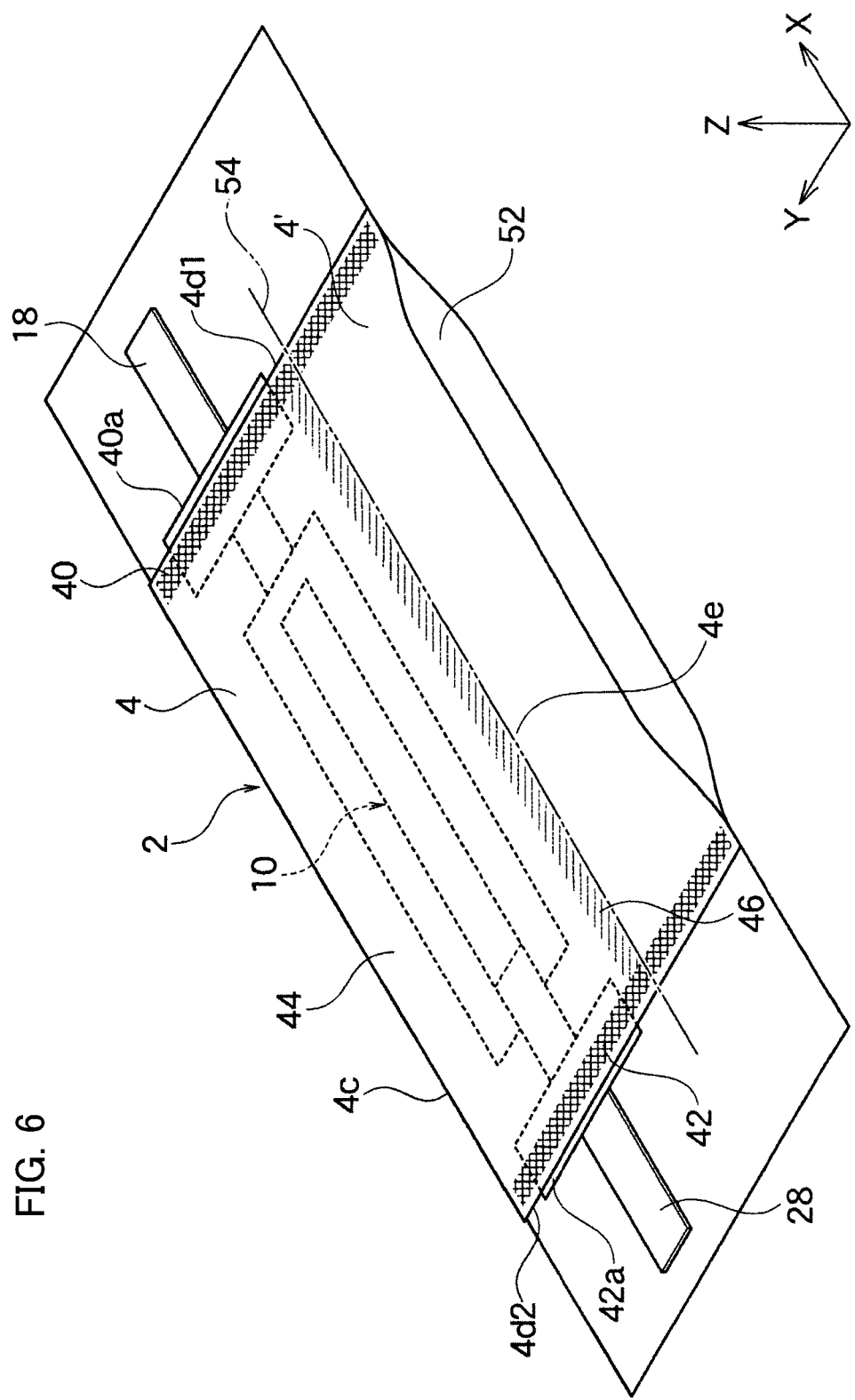
FIG. 6 is a perspective figure showing a step following FIG. 5A or FIG. 5B.

In the present embodiment, as shown in FIG. 5 and FIG. 6, the sealing tapes 40a and 42a and the outer edges 4d1 and 4d2 are integrated by the heat sealing; thereby the first sealing part 40 and the second sealing part 42 are formed. Here, as shown in FIG. 2A, part of the inner layer (resin) 4B formed at the inner surface of the exterior sheet 4 contacts and adheres to one side of the lead terminals 18 and 28, then forms the heat bonding part 4Ba. Thereby, the sealing property of the first sealing part 40 and the second sealing part 42 is improved.

Also, in the third sealing part 44 shown in FIG. 1A, the exterior sheet 4 is folded at the folding outer edge 4c of the exterior sheet 4, and the inner layer 4B of the exterior sheet 4 is integrally bonded by the heat sealing. In the fourth sealing part 46, the inner layer 4B of each outer edge 4e of the front face 4a and the back face 4b of the exterior sheet 4 is integrally bonded by the heat sealing.

The first sealing part 40 is formed so that each end of the first sealing part 40 in Y axis direction is respectively connected with one end of the third sealing part 44 and one end of the fourth sealing part 46. The second sealing part 42 is formed so that the other end of the third sealing part 44 and the other end of the fourth sealing part 46 are connected with both ends of the second sealing part 42. Hence, the inner side of the exterior sheet 4 is tightly sealed from the outside of the exterior sheet 4.

In EDLC2 of the present embodiment, the first lead terminal 18 and the second lead terminal 28 of the element main body 10 extend to the opposite direction along the longitudinal direction (X axis direction) of EDLC2. Therefore, the width in Y axis direction of EDLC2 can be made small, and also the thickness of the first sealing part 40 and the second sealing part 42 can be a bare minimum, and the entire EDLC2 can be made thin as well. Thereby, EDLC2 can be made compact and thin.

In EDLC2 of the present embodiment, for example the first lead terminal 18 is the positive electrode and the second lead terminal 28 is the negative electrode, and they are connected to the element main body 10 immersed in the electrolyte. EDLC has a maximum withstand voltage of about 2.85 V per single element, and in order to improve the withstand voltage according to the use, the plural elements may be connected in series. EDLC2 of the present embodiment is extremely thin and has a sufficient withstand voltage, thus it can be suitably used in place of the battery incorporated into the thin electronic device such as IC card or so.

Next, an example of the production method of EDLC2 of the present embodiment is described by referring to FIG. 3 to FIG. 6.

Figure 4A:
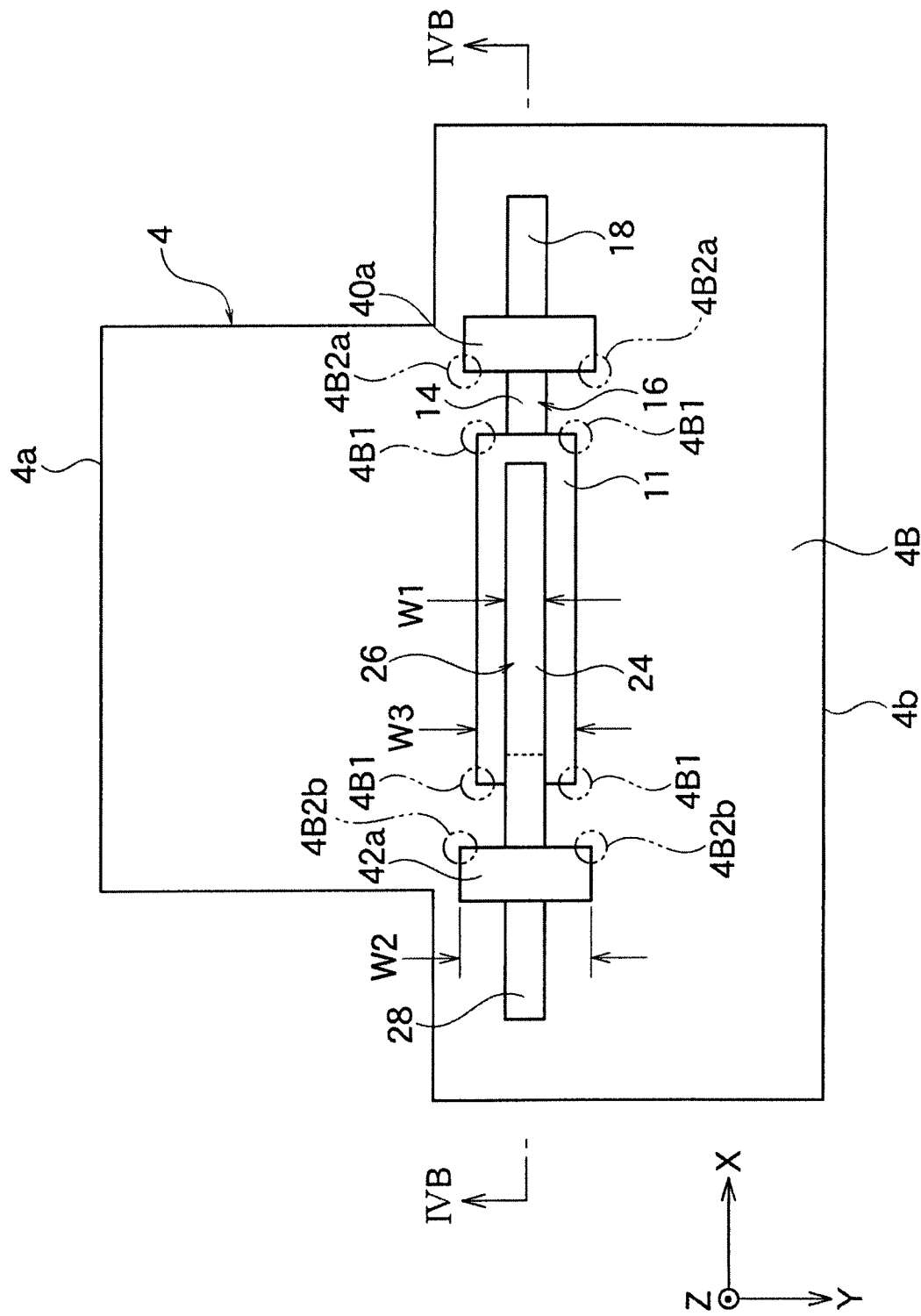
FIG. 4A is a perspective cross section figure showing a step following FIG. 3.
Figure 4B:
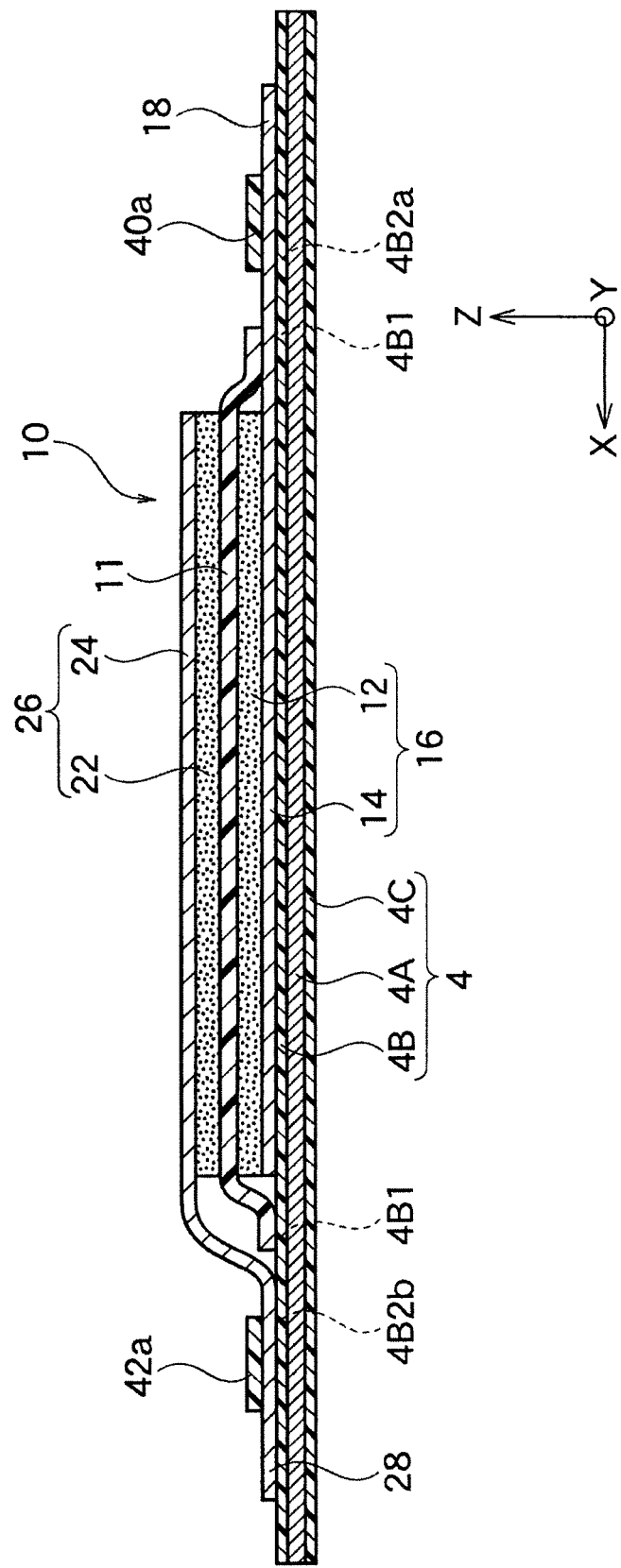
FIG. 4B is a schematic cross section figure along IVB-IVB line of FIG. 4A.

As shown in FIG. 3, FIG. 4A, and FIG. 4B, first the element main body 10 is produced. In order to produce the element main body 10, as shown in FIG. 3, one of electrode 16 is prepared, and a tape 40a is attached to the boundary part between the electrode 16 and the lead terminal 18. Then, the electrode 16 and the tape 40a are fixed at the predetermined position of the inner layer 4B which is the back face 4b of the exterior sheet 4 so that the active material layer 12 of the electrode 16 is facing towards up in Z axis direction.

Therefore, a tip of a spot heat bonding apparatus (not shown in figure) is applied to an inner corner part of the tape 40a not overlapping with the electrode 16 when looking from Z axis direction, and the tape 40a is partially heat bonded to the inner layer 4B made of resin formed on an inner surface of the exterior sheet 4. As a result, at the inner layer 4B made of resin, the tape bonding part 4B2a is partially formed (in a spot form) at the position corresponding to the inner corner part of the tape 40a. These tape bonding parts 4B2a are formed at the inner position not overlapping with the sealing part 40 obtained at the end (see FIG. 6), but these may be connected with the sealing part 40. That is, part of the tape bonding part 4B2a which is used as a temporary stopper part during the production step may be formed at the position which does overlap with the sealing part 40 formed at the end.

The shape of the tape bonding part 4B2a which is partially formed is not particularly limited, for example a circle shape having an outer diameter of 0.2 to 1.0 mm or so, an oval shape having about the same size, or polygonal shape (triangle or more) having about the same size may be exemplified. The tape bonding part 4B2a fixes the tape 40a together with the internal electrode 16 to the inner layer 4B made of resin of the exterior sheet 4 at the predetermined position.

Next, the separator sheet 11 is set so that it covers the active material layer of the electrode 16, and the tip of the spot heat bonding apparatus (not shown in figure) is applied to four corners of the separator sheet 11 (the part not overlapping with the electrode 16) as shown in FIG. 4A. As a result, the separator sheet 11 is partially heat bonded to the inner layer 4B made of resin of the exterior sheet 4, and the separator bonding part 4B1 is partially formed on the inner layer 4B made of resin at the position corresponding to the corner part of the separator sheet 11. The shape and size of the separator bonding part 4B1 is the same as the tape bonding part 4B2a. The separator bonding part 4B1 fixes the separator sheet 11 at the predetermined position of the inner layer 4B made of resin of the exterior sheet 4.

Next, other electrode 26 is prepared, and the tape 42a is attached to the boundary part between the electrode 26 and the lead terminal 28. Then, the tape 42a together with the electrode 26 are fixed at the predetermined position of the inner layer 4B of the back face 4b of the exterior sheet 4 so that the second active material layer 22 of the electrode 26 is facing down in Z axis direction (the side facing the separator 11). Note that, as shown in FIG. 4B, the second active material layer 22 of the electrode 26 is preferably facing towards the first active material layer 12 of the electrode 16 by being precisely positioned interposing the separator sheet 11.

Therefore, as shown in FIG. 4A, a tip of a spot heat bonding apparatus (not shown in figure) is applied to an inner corner part of the tape 42a not overlapping with the electrode 26 when looking from Z axis direction, and the tape 42a together with the electrode 26 are partially heat bonded to the inner layer 4B made of resin formed on the inner surface of the exterior sheet 4. As a result, as shown in FIG. 4B, the tape bonding part 4B2b is partially formed on the inner layer 4B made of resin at the position corresponding to the inner corner part of the tape 42a. These tape bonding parts 4B2b are formed at the inner position which does not overlap with the sealing part 42 obtained at the end (see FIG. 6), but these may be connected with the sealing part 42.

The size and shape of the tape bonding part 4B2b which is partially formed is the same as the tape bonding part 4B2a.

The tape bonding part 4B2b fixes the tape 42a together with the electrode 26 at the predetermined position against the inner layer 4B made of resin of the exterior sheet 4. As a result, as shown in FIG. 4B, at both sides of the separator sheet 11, the internal electrodes 16 and 26 are stacked so that each of the active material layers 12 and 22 are positioned and in contact.

At each of lead terminals 18 and 28, the sealing tapes 40a and 42a are respectively adhered only to the one side of surface of the lead terminals 18 and 28 in a position of X axis which corresponds to the first sealing part 40 and the second sealing part 42 as mentioned in above (see FIG. 4B). The width W2 in Y axis direction of the sealing tapes 40a and 42a (see FIG. 4A) is preferably longer by 0.5 to 3 mm or so than Y axis direction width of the lead terminals 18 and 28. The width in Y axis direction of the sealing tapes 40a and 42a corresponds to the width in Y axis direction of the first sealing part 40 and the second sealing part 42 of EDLC2 shown in FIG. 1, and defines Y axis direction width W0 of EDLC2.

If the width W2 in Y axis direction of the sealing tapes 40a and 42a shown in FIG. 4A is too narrow, the sealing at the first sealing part 40 and the second sealing part 42 shown in FIG. 1A may become insufficient. If it is too wide, the width W0 in Y axis direction of EDLC2 may become unnecessarily wide. The width in X axis direction of the sealing tapes 40a and 42a corresponds to the length L1 in X axis direction of the first sealing part 40 and the second sealing part 42 shown in FIG. 2 and is preferably 2 to 4 mm.

Next, as shown in FIG. 5A to FIG. 6, the exterior sheet 4 is folded at the folding outer edge 4c so that it covers the entire element main body 10, thus the element main body 10 is covered by the front face 4a and the back face 4b of the exterior sheet 4. Note that, the exterior sheet 4 is formed so as to be longer than the width W0 in Y axis direction of EDLC2. The width in X axis direction at the front face 4a of the exterior sheet 4 is adjusted so that the outer edge 4d1 on the side of the first sealing part 40 of the exterior sheet 4 overlaps with the sealing tape 40a, and the outer edge 4d2 on the side of the second sealing part 42 of the exterior sheet 4 overlaps with the sealing tape 42a.

Next, as shown in FIG. 6, the exterior sheet 4 covering the entire element main body 10 is set to a jig not shown in the figure, then the folding outer edge 4c of the exterior sheet 4 is pressurized and heated, thereby the third sealing part 44 is formed. Next, the outer edge 4d1 on the side of the first sealing part 40 and the outer edge 4d2 on the side of the second sealing part 42 of the exterior sheet 4 are pressurized and heated, thereby the first sealing part 40 and the second sealing part 42 are formed.

Here, as shown in FIG. 2A, part of the inner layer (resin) 4B formed on the lower side of the inner surface of the exterior sheet 4 contacts with the one side of the surface (surface of lower side) of the lead terminals 18 and 28, thereby forms the heat bonding part 4Ba. Also, the sealing tapes 40a and 42a attached to the other side of the surface (surface of upper side) of the lead terminals 18 and 28 are integrated with the inner layer 4B of the exterior sheet 4 as the adhesive resin which is fluidized by pressure and heat, thereby forms the first sealing part 40 and the second sealing part 42 after solidifying. Also, at the same time, part of the sealing tapes 40a and 42a as the adhesive resin which is fluidized by pressure and heat protrudes out from the outer edge of the exterior sheet 4 which is positioned on the upper side, and protruded portions 40b and 42b which is portion of the sealing tapes 40a and 42a cover the periphery of the outer edge of the exterior sheet 4.

Next, as shown in FIG. 6, the electrolyte is injected from an opening end 52 of the exterior sheet 4 where the fourth sealing part 46 is not formed, finally, the fourth sealing part 46 is formed by heat sealing similarly as mentioned in the above. Then, the exterior sheet 4 is cut along the cutting line 54 at the outside of the fourth sealing part 46 to remove an excessive portion of exterior sheet 4; thereby EDLC2 of the present embodiment is made.

In the present embodiment, the sealing tape 40*a* attached to the one side of the surface of the first lead terminal 18 is heat sealed (heat compressed) at the outer edge 4*d*1 on the side of the first sealing part 40 of the exterior sheet 4 of the upper side, thereby the first sealing part 40 is formed. Note that, the first sealing part 40 includes the heat bonding part 4Ba which is formed at part of the inner layer 4B made of resin formed on the inner surface of the exterior sheet 4 of the lower side. Also, similarly, the sealing tape 42*a* attached to the one side of the surface of the second lead terminal 28 is heat sealed (heat compressed) at the outer edge 4*d*2 on the side of the second sealing part 42 of the exterior sheet 4 of the upper side, thereby the second sealing part 42 is formed. Note that, the second sealing part 42 includes the heat bonding part 4Ba which is formed at part of the inner layer 4B made of resin formed on the inner surface of the exterior sheet 4 of the lower side.

In the present embodiment, the insulation tapes 40*a* and 42*a* which constitute the sealing part are attached only to the one side of the surface (upper side surface) of the lead terminals 18 and 28 to function as adhesive resin, and other face (lower side surface) is formed with the heat bonding part 4Ba by directly contacting to the inner layer 4B made of resin formed on the inner surface of the exterior sheet 4. Thereby, the sealing of the inside of the device can be secured in good condition and also the short circuit can be effectively avoided. As a result, the thickness of the sealing parts 40 and 42 which are the thickest part in sealing parts can be thinned as much as possible while securing the sealing and avoiding the short circuit.

That is, EDLC2 according to the present embodiment can attain the electrochemical device which is thinned to the level allowing to be incorporated into the thin electronic devices such as IC card or so while securing the sealing of the inside of the device and avoiding the short circuit.

Also, in the present embodiment, part of the adhesive resin constituting the sealing parts 40 and 42 protrudes to the outside from the outer edge of the exterior sheet 4 of the upper side, and covers the periphery of the outer edge of the exterior sheet 4. Therefore, at the periphery of the outer edge of the exterior sheet 4, end of the metal sheet 4A constituting the exterior sheet 4 does not expose, and the short circuit between the lead terminals 18 and 28 with the metal sheet 4A can be effectively prevented.

Further, the device 2 of the present embodiment has the support sheets 4/1 and 4/2 for preventing the bending of the lead terminals 18 and 28 extending from the sealing parts 40 and 42, thus the bending of the lead terminals 18 and 28 extending from the sealing parts 40 and 42 can be effectively prevented. Also, the support sheets 4/1 and 4/2 are constituted by extending part of the outer edge of the exterior sheet 4 of the lower side positioned at the sealing parts 40 and 42 to the outside, thus the support sheets 4/1 and 4/2 can be easily formed.

Also, the length of the protrusion of the support sheets 4/1 and 4/2 are longer than the length of the protrusion of the lead terminals 18 and 28, thus the lead terminals 18 and 28 extending from the sealing parts 40 and 42 can be effectively prevented from bending.

Particularly, in the present embodiment, the separator bonding part 4B1 for partially bonding a part of the separator sheet 11 to the inner surface of the exterior sheet 4 is formed to the inner layer 4A made of resin present on the inner surface of the exterior sheet 4. Thus, at least the separator sheet 11 is positioned on the inner side of the exterior sheet 4, and its position against the internal electrodes 16 and 26 can be determined easily, thus the positioning tape which remained inside of the electrochemical device 2 with element 10 conventionally is unnecessary.

That is, the electrochemical device 2 according to the present embodiment enables further thinning of the device 2 while preventing the position shift between the separator sheet 11 and the pair of the internal electrodes 16 and 26 on the inner side of the exterior sheet 4.

Further, the separator bonding part 4B1 is partially bonded to the corner parts of the separator sheet 11 in a manner not overlapping with the internal electrodes 16 and 26 when looking from Z axis direction, thus the effective area of the active material layers 12 and 24 formed on the internal electrodes 16 and 26 can sufficiently exhibit its function.

Furthermore, as shown in FIG. 4A and FIG. 5A, the tape bonding parts 4B2*a* and 4B2*b* for partially bonding the inner corner parts of the tapes 40*a* and 40*b*, which do not overlap with the internal electrodes 16 and 26 when looking at the inner side of the exterior sheet 4 from Z axis direction, to the inner surface of the exterior sheet are formed on the inner layer 4B separate from the separator bonding part 4B1. By constituting as such, the internal electrodes 16 and 26 are bonded to the inner surface of the exterior sheet 4 by tapes 40*a* and 40*b* and positioned. Therefore, the position of the pair of the internal electrodes 16 and 26 with respect to the separator sheet 11 can be easily determined, and the positioning tape (different from the tapes 40*a* and 40*b*) is unnecessary, which contributes for attaining a thin device 2.

Also, the tape bonding parts 4B2*a* and 4B2*b* are formed at a position where they do not overlap with the internal electrodes 16 and 26 when looking from Z axis direction, thus even if the tape bonding parts 4B2*a* and 4B2*b* become thinner, the short circuit between the internal electrodes 16 and 26 and the metal sheet stacked on the inner side of the exterior sheet does not occur.

Further, the exterior sheet 4 has the front face 4*a* covering the front face of the element main body 10, and the back face 4*b* covering the back face of the element main body 10, and both of the pair of the internal electrodes 16 and 26 are partially bonded to the inner layer 4B of the back face 4*b* of the exterior sheet 4 on the tape bonding parts 4B2*a* and 4B2*b*. Therefore, the separator sheet 11 and the pair of the internal electrodes 16 and 26 can be positioned with respect to the back face 4*b* of the exterior sheet 4, thus the mutual shift of the internal electrodes 16 and 26 does not occur, and hence the performance of the device improves. Also, the positioning tape is unnecessary, which contributes to the thinning of the device. For example, the maximum thickness of EDLC2 can be 1 mm or less, preferably 0.9 mm or less, and more preferably 0.5 mm or less.

Second Embodiment

Figure 1B:
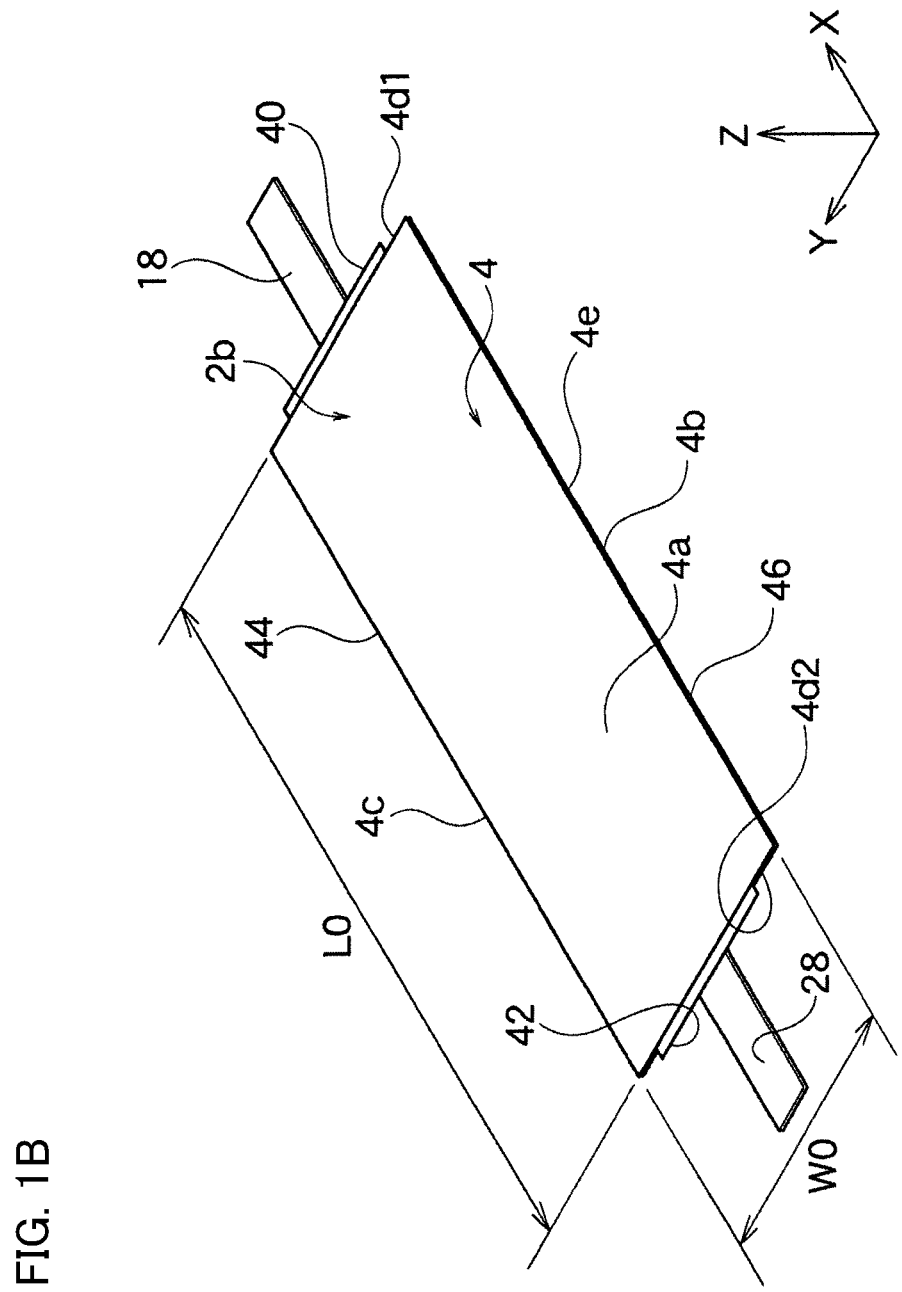
FIG. 1B is a perspective figure of an electric double layer capacitor according to another embodiment of the present invention.

As shown in FIG. 1B, EDLC2*a* of the present embodiment is same as EDLC2 of the first embodiment except for not having the support sheets 4/1 and 4/2 shown in FIG. 1A, thus the same numbers are given to the same members in the figures, and the description of the same parts is omitted.

Third Embodiment

Figure 2B:
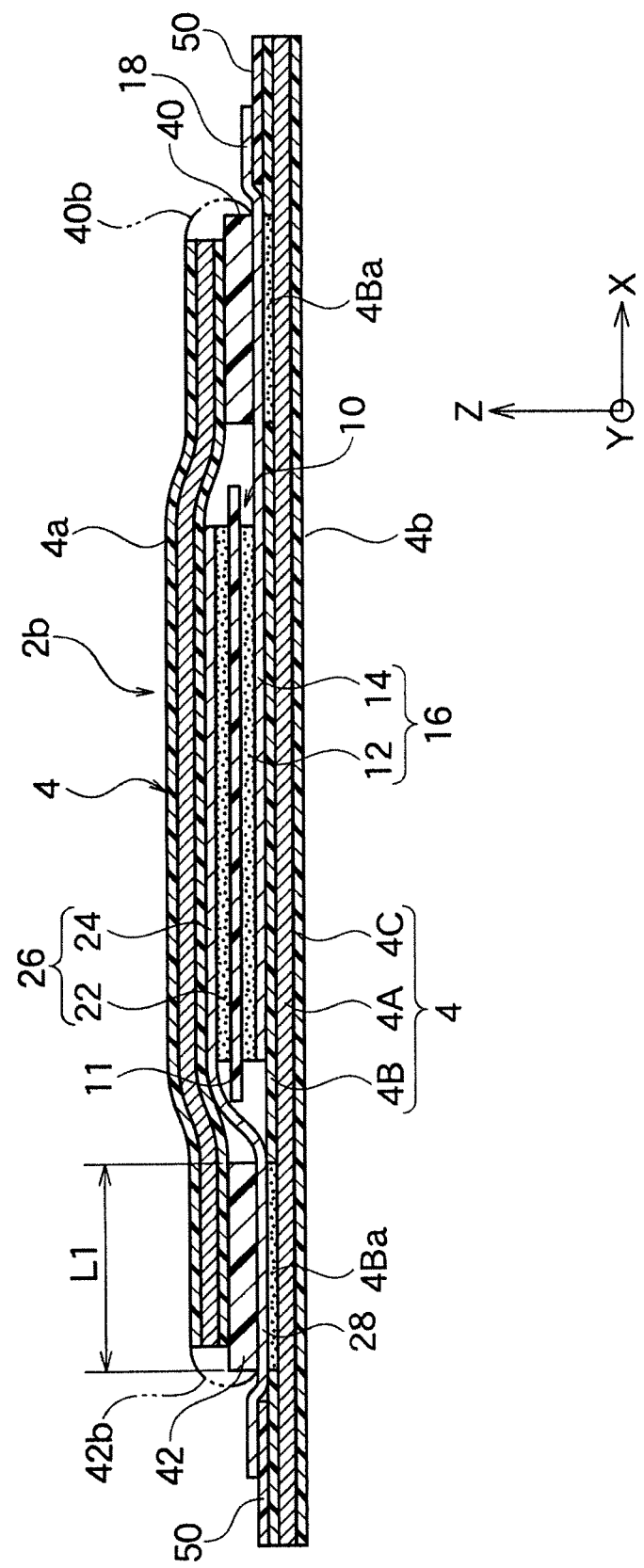
FIG. 2B is a schematic cross section figure of the electric double layer capacitor according to other embodiment of the present invention.

As shown in FIG. 2B, for EDLC2b of the present embodiment, the heat resistant insulation layer 50 is stacked on the surface of the support sheets 4f1 and 4f2 which contact with the lead terminals 18 and 28 protruding out from the sealing parts 40 and 42. By constituting as such, even if heat is applied when electrically connecting the lead terminals 18 and 28 with an external connective terminal (not shown in the figure), the short circuit between the metal sheet 4A present inside exterior sheet 4 and the lead terminals 18 and 28 can be effectively prevented.

As the resin constituting the heat resistance insulation layer 50, for example polyethyleneterephthalate (PET) is preferably used, but nylon, PET, PC, PES, PEN, PI, and fluorine resin or so may be used as well.

The effect and the other constitution of the present embodiment are same as the first and the second embodiment, thus the same numbers are given to the same members in the figures, and the description of the same parts is omitted.

Fourth Embodiment

Figure 2C:
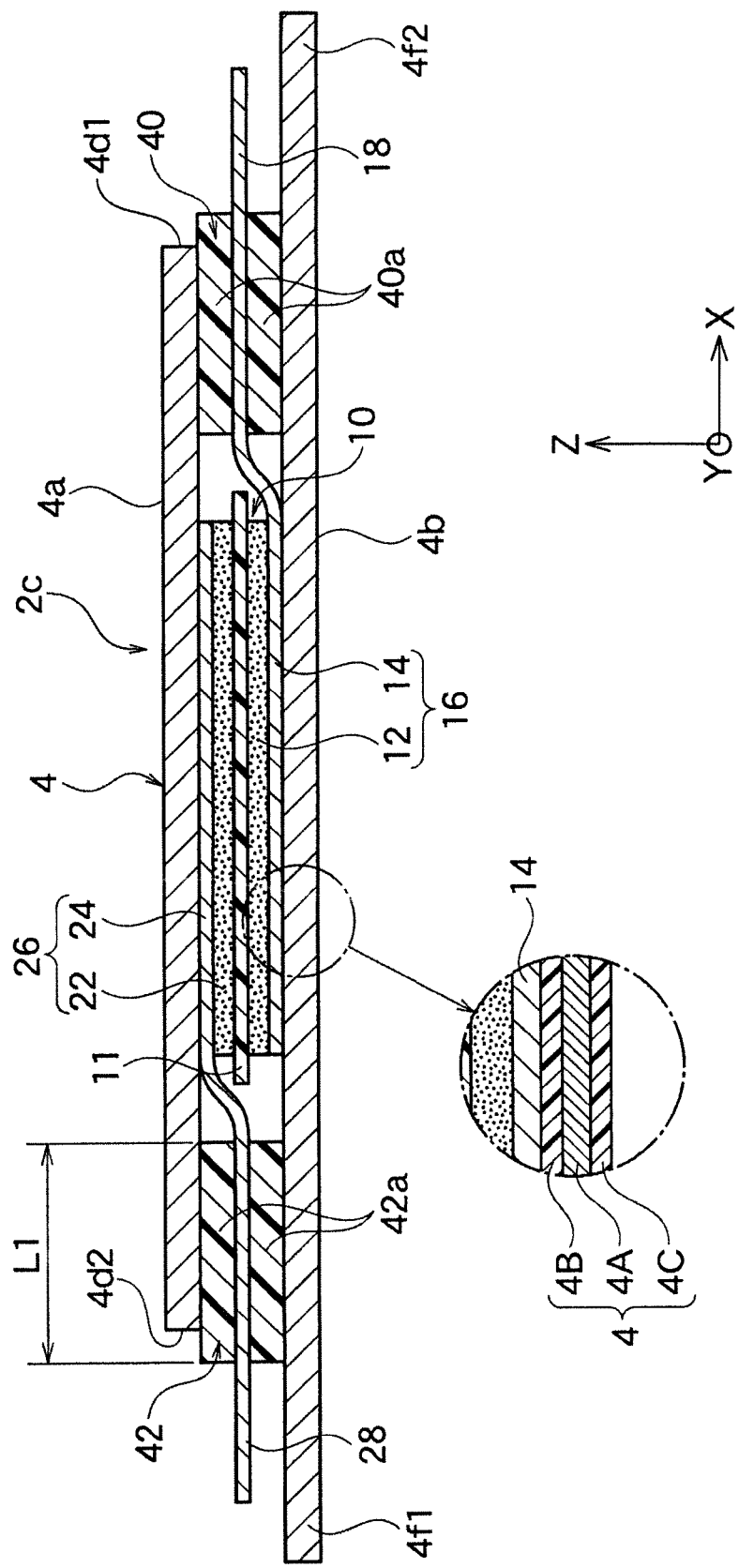
FIG. 2C is a schematic cross section figure of the electric double layer capacitor according to further other embodiment of the present invention.

As shown in FIG. 2C, in EDLC2c of the present embodiment, the sealing parts 40 and 42 formed at the outer edges 4d1 and 4d2 of the exterior sheet 4 where the lead terminals 18 and 28 extend to the outside in X axis direction are respectively formed by a pair of sealing tapes 40a and 42a. That is, the pair of the sealing tapes 40a and 42a are respectively attached so as to cover the front and back surface of the lead terminals 18 and 28 interposing the lead terminals 18 and 28, and these are heat compressed and constitute the sealing parts 40 and 42.

In case of the present embodiment, the thickness of the sealing parts 40 and 42 are thicker than that described in aforementioned embodiments, but compared to the conventional thickness, it is sufficiently thin. The effect and the other constitution of the present embodiment are same as the first to third embodiments, thus the same numbers are given to the same members in the figures, and the description of the same parts is omitted.

Fifth Embodiment

In the present embodiment, instead of the step shown in FIG. 5A, the step shown in FIG. 5B is used, and other than that, other constitution and effect of the present embodiment are same as the first to fourth embodiments, thus the same numbers are given to the same members in the figures, and the description of the same parts is omitted.

In the present embodiment, as shown in FIG. 5B, it is the same as the first embodiment up until partially forming the tape bonding part 4B2a and the separator bonding part 4B1 to the inner layer 4B which corresponds to the back face 4b of the exterior sheet 4. Then, before or after, or at the same time, the tape bonding part 4B2b is formed partially to the inner layer 4B which correspond to the front face 4a of the exterior sheet 4, and other tape 42a is positioned and fixed together with the electrode 26. Here, the active material layer 22 of other electrode 26 faces up in Z axis direction so that the collector layer 24 of other electrode 26 contacts with the inner layer 4B of the exterior sheet 4.

Then, as shown in FIG. 6, the exterior sheet 4 is folded at the folding outer edge 4c so as to cover the entire element main body 10, thereby the element main body 10 is covered with the front face 4a and the back face 4b of the exterior sheet 4. The subsequent steps are the same as the first embodiment mentioned in the above.

In the present embodiment, the position of the separator sheet 11 and the pair of the internal electrodes 16 and 26 can be determined against the front face 4a and the back face 4b of the exterior sheet 4, thus the position shift of the internal electrodes 16 and 26 does not occur, hence the performance of the device improves. Also, the positioning tape becomes unnecessary, and contributes to the thinning of the device. Further, in the present embodiment, compared to the embodiment shown in FIG. 5A, the internal electrode 26 is more flat and fixed against the inner layer 4B of the front face 4a of the exterior sheet 4, thus the internal stress acting on the internal electrode 26 can be reduced.

Sixth Embodiment

Figure 7:
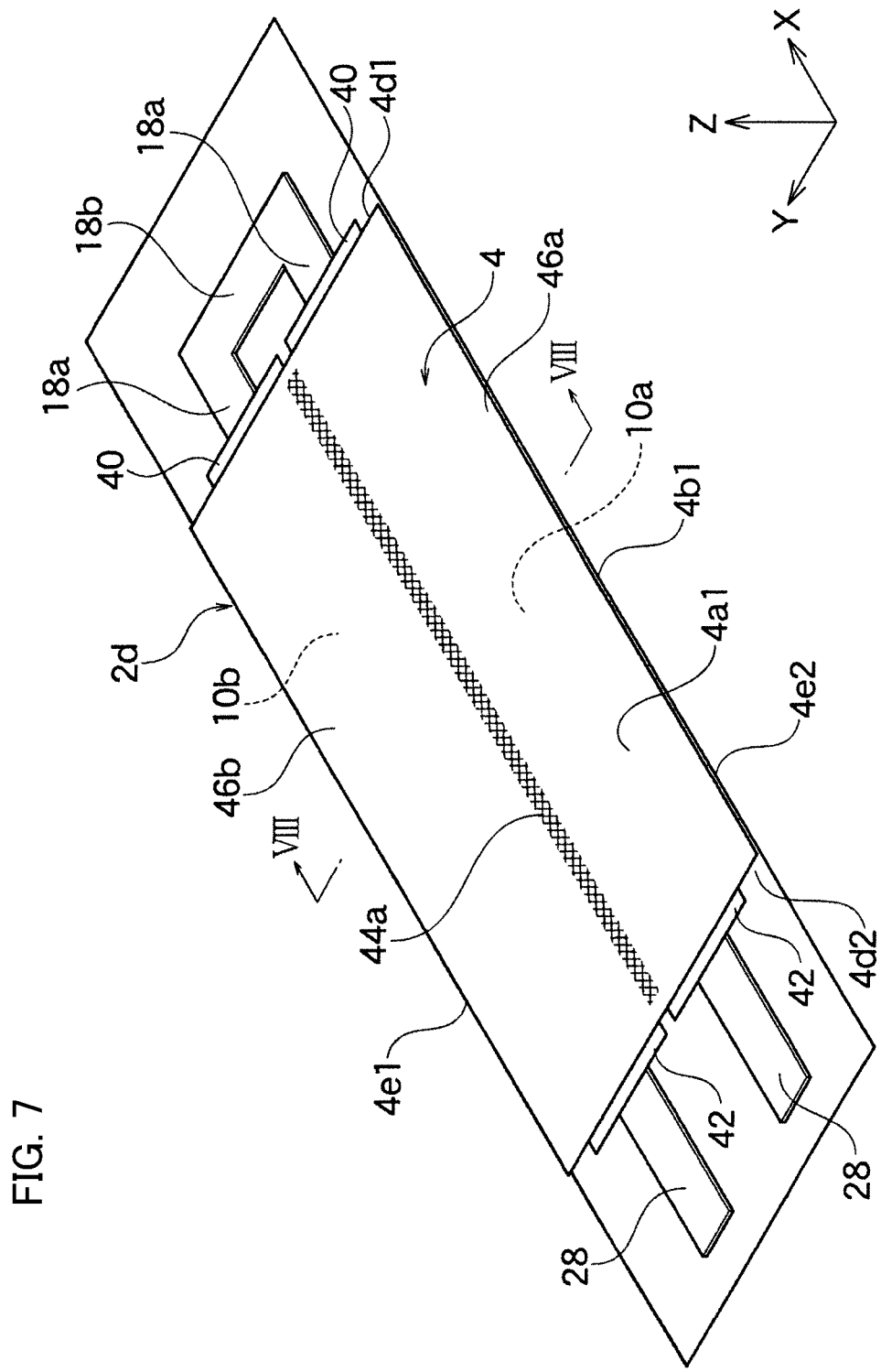
FIG. 7 is a perspective figure of the electric double layer capacitor according to other embodiment of the present invention.

As shown in FIG. 7, in EDLC2 of the present embodiment, two element main bodies 10a and 10b aligning in Y axis direction are incorporated on the inner side of the exterior sheet 4. Other than that, it is same as the first embodiment, thus the same numbers are given to the same members in the figures, and the description of the same parts is partially omitted; and the parts which differ are described.

Figure 8:
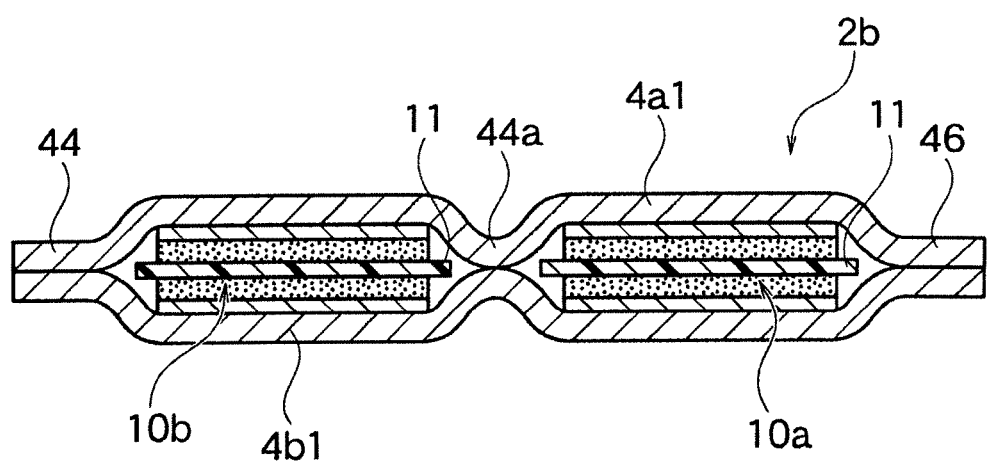
FIG. 8 is a cross section figure of an essential part along VIII-VIII line of FIG. 7.
Figure 8:
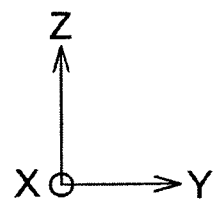

In the present embodiment, as shown in FIG. 7, the exterior sheet 4 is made of the front face sheet 4a1 and the back face sheet 4b1, and compared to the exterior sheet 4, its size is about twice as large as that of the exterior sheet 4 shown in FIG. 1 in Y axis direction. On the inner side of the exterior sheet 4, as shown in FIG. 8, two element main bodies 10a and 10b are incorporated, and each of the element main bodies 10a and 10b has the same structure as the element main body 10 of the first embodiment.

In the present embodiment, the second lead terminals 28 and 28 of the element main bodies 10a and 10b are formed separately, but the first lead terminals 18a of the element main bodies 10a and 10b are integrally formed with the connection part 18b and are continuous. That is, as shown in FIG. 9, the element main bodies 10a and 10b are connected in series via the first lead terminals 18a and the connection part 18b formed integrally and continuously with each of the first collector layers 14 of the element main bodies 10a and 10b.

At the center part in Y axis direction of the exterior sheet 4, the third sealing part 44a is formed along X axis direction, thereby the flow of the electrolyte is blocked between the element main bodies 10a and 10b. The space where the element main body 10a is housed is sealed by the first sealing part 40, the second sealing part 42, the third sealing part 44a, and the fourth sealing part 46a which are formed continuously with the exterior sheet 4; thereby the electrolyte is retained. Similarly, the space where the element main body 10b is housed is sealed by the first sealing part 40, the second sealing part 42, the third sealing part 44a, and the fourth sealing part 46b which are formed continuously with the exterior sheet 4; thereby the electrolyte is retained.

Figure 9:
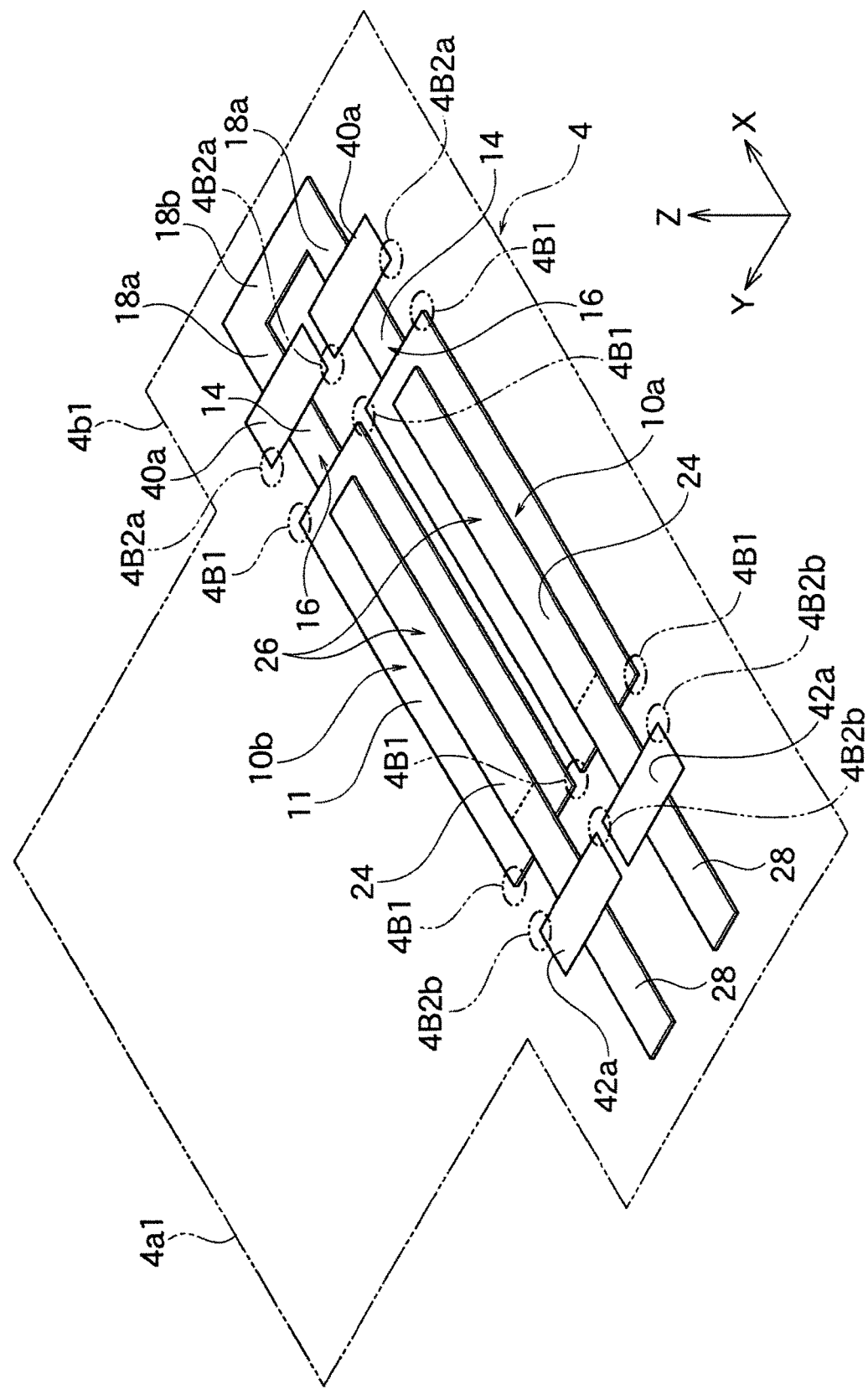
FIG. 9 is a schematic perspective figure showing the method of production of the electric double layer shown in FIG. 7.
Figure 10:
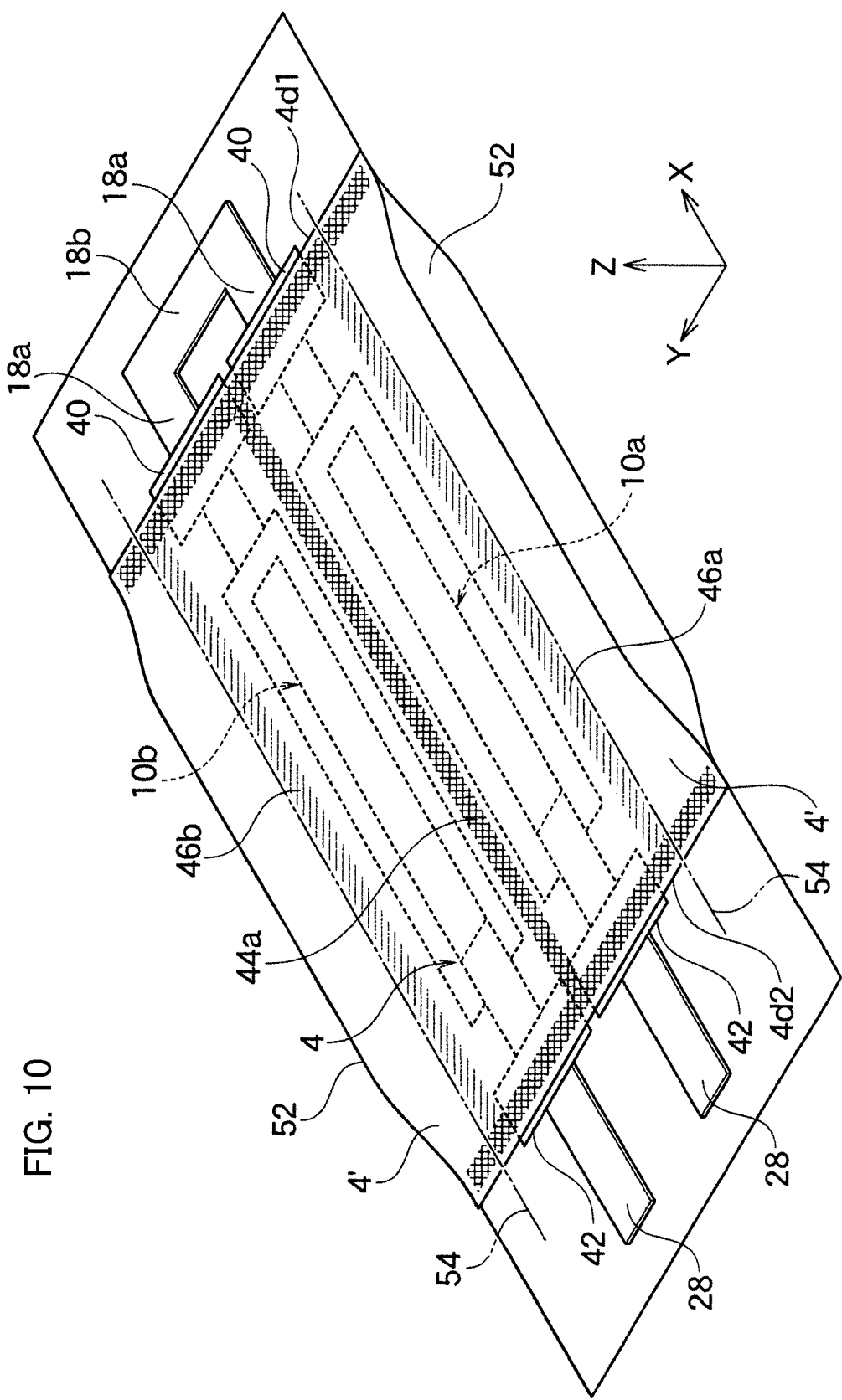
FIG. 10 is a perspective figure showing a step following FIG. 9.

Next, the method of producing EDLC2d of the present embodiment is described using FIG. 9 to FIG. 10.

As shown in FIG. 9, first, two element main bodies 10a and 10b are formed so as to align in Y axis direction on a pair of the separator sheets 11. Note that, two element main bodies 10a and 10b may be formed on single separator sheet 11. The production method of the element main bodies 10a and 10b are same as the first embodiment.

As mentioned in the above embodiments, the sealing tapes 40a and 42a are attached to the lead terminals 18a and 28 of the element main bodies 10a and 10b on the one side of the surface of the lead terminals 18a and 28. Also, as the method of forming the tape bonding parts 4B2a and 4B2b and the separator bonding part 4B1, it is the same as mentioned in the above embodiments. In the present embodiment, the corner part of two separator sheets 11 adjacent to each other can be fixed by single separator bonding part 4B1.

Also, in the present embodiment, the inner corner part of the tapes 40a which are respectively adjacent to each other may be fixed by single tape bonding part 4B2a; and the inner corner part of the tapes 42a which are adjacent to each other may be fixed by single tape bonding part 4B2b. In such case, the single tape bonding part 4B2a and 4B2b may be larger than other tape bonding parts 4B2a and 4B2b. Also, single continuous tape 40a may be used instead of the tapes 40a adjacent to each other; and single tape 42a may be used instead of the tapes 42a adjacent to each other.

Next, the front face sheet 4a1 and the back face sheet 4b1 constituting the exterior sheet 4 are folded against each other so as to cover the entire element main bodies 10a and 10b. Note that, the exterior sheet 4 is formed so as to be longer than the width in Y axis direction of EDLC2. The width in X axis direction of the exterior sheet 4 is adjusted regulated so that the outer edge 4d1 on the side of the first sealing part 40 of the exterior sheet 4 overlaps with the tape 40a, and the outer edge 4d2 on the side of the second sealing 40 of the exterior sheet 4 overlaps with the tape 42a.

Next, as shown in FIG. 10, the exterior sheet 4 covering the entire element main body 10 is set to the jig not shown in the figure, and the center part in Y axis direction of the exterior sheet 4 is heat pressed along X axis direction, thereby the third sealing part 44a is formed. Next, the outer edge 4d1 on the side of the first sealing part 40 and the outer edge 4d2 on the side of the second sealing part 40 of the exterior sheet are heat pressed; thereby the first sealing part 40 and the second sealing part 42 are formed.

Next, the electrolyte is injected from the opening end 52 of the exterior sheet 4 where the fourth sealing parts 46a and 46b are not formed, finally, the fourth sealing parts 46a and 46b are formed by heat sealing similarly as mentioned in above. Then, the exterior sheet 4 is cut along the cutting line 54 at the outside of the fourth sealing parts 46a and 46b to remove an excessive portion of the exterior sheet 4', thereby EDLC2d of the present embodiment shown in FIG. 7 is made.

Note that, in the embodiment mentioned in above, the lead terminals 18a extending in X axis direction of the exterior sheet 4 is integrally connected by the connection part 18b in advance, but the lead terminals 18a which does not have the connection part 18b may extend from the first sealing part 40.

In the present embodiment, the lead terminals extending out to the same side in X axis direction are connected in series or in parallel, thereby the capacity can be increased, and the voltage resistance can be enhanced. Also, in the present embodiment, the support sheets 4f1 and 4f2 shown in FIG. 1 are used, thus the connection part 18b, the lead terminals 28 and 18a can be effectively prevented from bending. The effect and other constitution of the present embodiment are same as the embodiments shown in the above.

Seventh Embodiment

In EDLC of the above mentioned embodiment, the first lead terminal 18 and the second lead terminal 28 of the element main body 10 extend to the opposite direction along the longitudinal direction (X axis direction) of EDLC2, 2a to 2d. However, as shown in FIG. 11A, in EDLC2e of the present embodiment all of the first to third lead terminals 18, 28, and 38 extend only to one side of X axis direction.

In the exterior sheet 4 of EDLC2e of the present embodiment, one sheet 4 is folded over at the second sealing part 42 to form the front face sheet 4a2 and the back face sheet 4b2. In the present embodiment, the sealing part which is formed on the outer edge of the exterior sheet 4 from which the lead terminals 18, 28, and 38 extend to the outside is the first sealing part 40. Also, the sheet folding part opposite of the outer edge of the exterior sheet 4 from which the lead terminals 18, 28, and 38 extend to the outside is the second sealing part 42. Further, the sealing parts which is formed on both sides of the outer edge of the exterior sheet 4 positioned opposite to each other in Y axis direction are the third sealing part 44 and the fourth sealing part 46.

In the present embodiment, one or plurality of sealing tapes 40a for forming the first sealing part 40 is partially heat bonded to the inner surface of the exterior sheet 4 as similar to the aforementioned embodiment, then the first sealing part 40 is formed. Other constitution and effect of the present embodiment are the same as the first embodiment and the second embodiment, hence the same reference numbers are given to the same members in the figures, and the description of the same part is omitted.

Figure 11A:
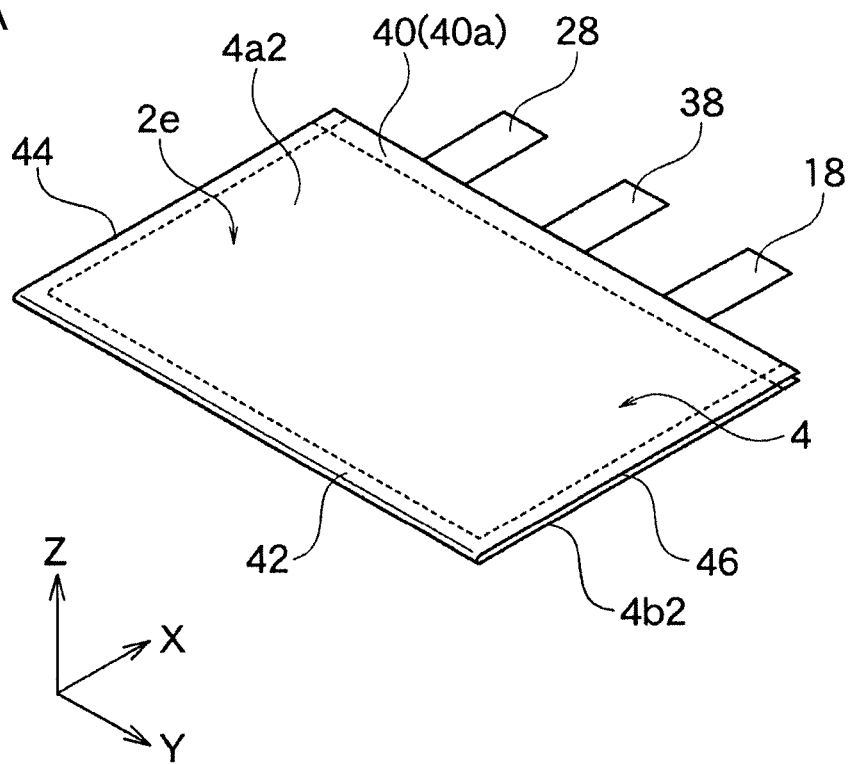
FIG. 11A is a perspective figure of the electric double layer capacitor according to other embodiment of the present invention.
Figure 11B:
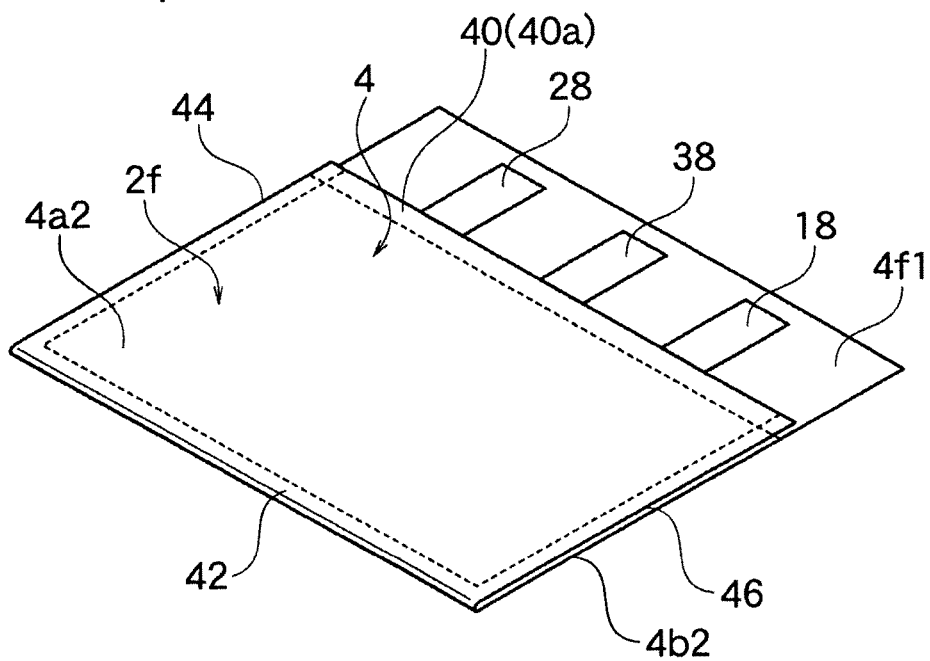
FIG. 11B is a perspective figure of the electric double layer capacitor according to other embodiment of the present invention.

EDLC2f of the embodiment shown in FIG. 11B is different from EDLC2e shown in FIG. 11A in a point that a support sheet 4f1 is formed.

Eighth Embodiment

Figure 12A:
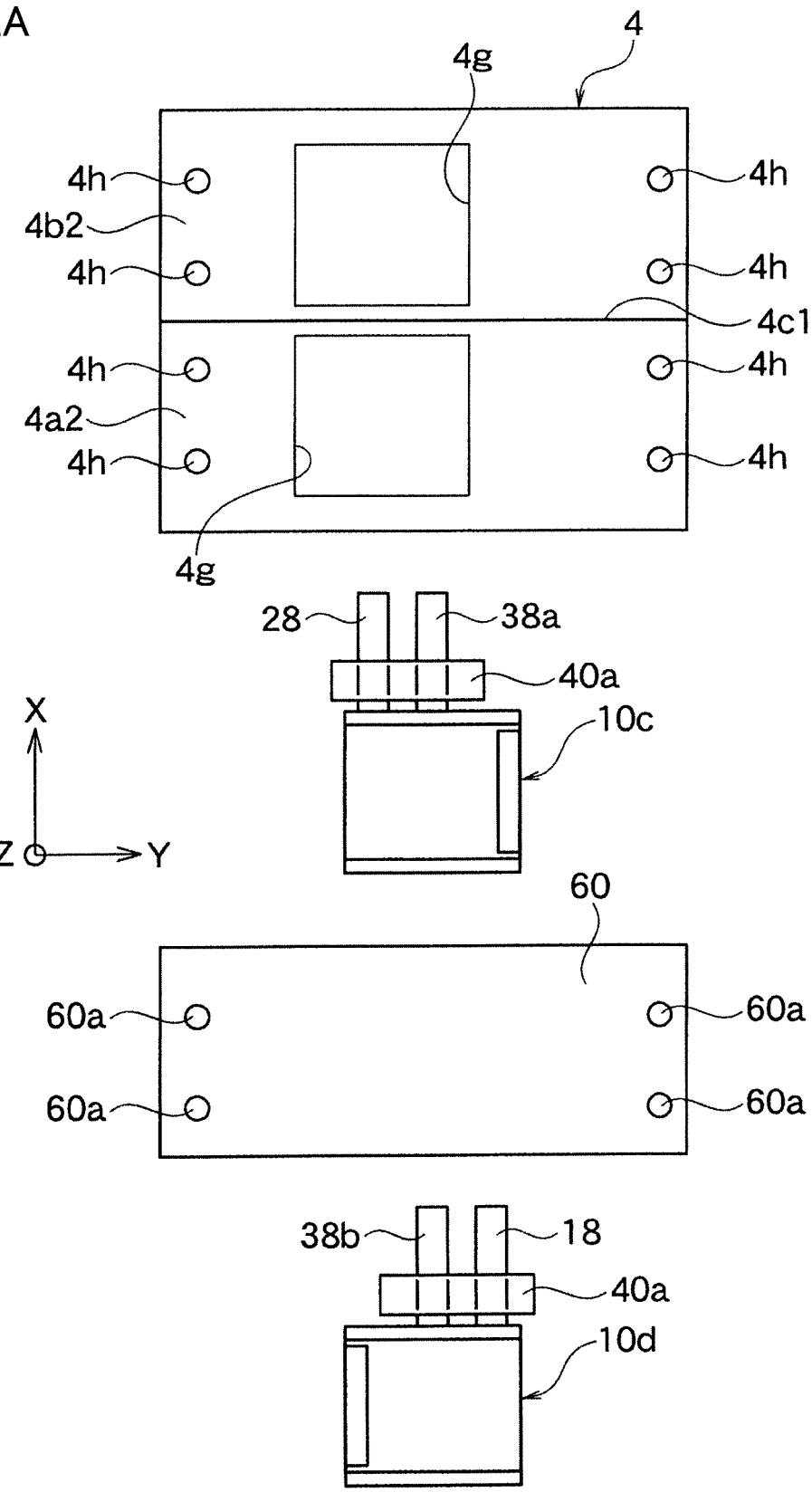
FIG. 12A is a schematic figure showing method of producing the electric double layer capacitor shown in FIG. 11A.

In the present embodiment, the method for producing EDLC2e shown in FIG. 11A is explained in detail. As shown in FIG. 12A, first the exterior sheet 4, the first element main body 10c, the separator sheet 60, and the second element main body 10d are prepared. The first element main body 10c has a stacking structure in Z axis direction as similar to the element main body 10 of the aforementioned embodiment. However, on the contrary to the element main body 10, the pair of lead terminals 28 and 38a extend only to one side in X axis direction at the different position in Y axis direction.

The second element main body 10d is same as the first element main body 10c, and the pair of the lead terminals 18 and 38b extend only to the one side in X axis direction at the different position in Y axis direction such that the front and the back of the first element main body 10c is flipped over. The lead terminals 38a and 38b of the element main bodies 10c and 10d are combined in the subsequent steps and constitute the lead terminal 38 shown in FIG. 11.

The lead terminals 28 and 38a of the first element main body 10c are provided with the sealing tape 40a similar to the one used in the aforementioned embodiment on one side or both sides of Z axis direction near the element main body 10c. Also, similarly, the lead terminals 18 and 38b of the second element main body 10d are provided with the sealing tape 40a similar to the one used in the aforementioned embodiment on one side or both sides of Z axis direction near the element main body 10d.

The exterior sheet 4 is the same exterior sheet as the exterior sheet 4 of the aforementioned embodiment, and it is a multilayer sheet wherein the metal sheet is placed between the inner layer and the outer layer. The exterior sheet 4 of the present embodiment can be folded along the folding line 4c1, and when it is folded, the inner layer of each of the front face sheet 4a2 and the back face sheet 4b2 faces against each other.

Each inner surface of the front face 4a2 and the back face 4b2 has depressed parts 4g for housing and determining the position of the element main body. When the exterior sheet 4 is folded along the folding line 4c1, each depressed part 4g face each other. In order to position these depressed parts 4g, plurality of positioning holes 4h are formed to end part of Y axis direction of the front face sheet 4a2 and the back face sheet 4b2. When the exterior sheet 4 is folded along the folding line 4c1, the positioning hole 4h formed to each of the front face sheet 4a2 and the back face sheet 4b2 is positioned by a pin or so (not shown in the figure), thereby the position of each depressed part 4g is determined.

The separator sheet 60 is constituted by electrical insulating material, and constituted by the material which does not permeate the electrolyte included in each of elements 10c and 10d, and furthermore a heat sealable material is preferable. For example, the separator sheet 60 is preferably constituted by polypropylene (PP), polyethersulfone (PES), polyethylene (PE), polyethyleneterephthalate (PET), polyethylenenaphthalene (PEN), fluororesin, polyimide (PI) or so. The thickness of the separator sheet 60 is preferably 20 to 100 μm. Plurality of the positioning holes 60a are formed on both ends in Y axis direction of the separator sheet 60, and these positioning holes 60a corresponds to the positioning hole 4h formed to each of the front face sheet 4a2 and the back face sheet 4b2, and are positioned in the step described in below.

Figure 12B:
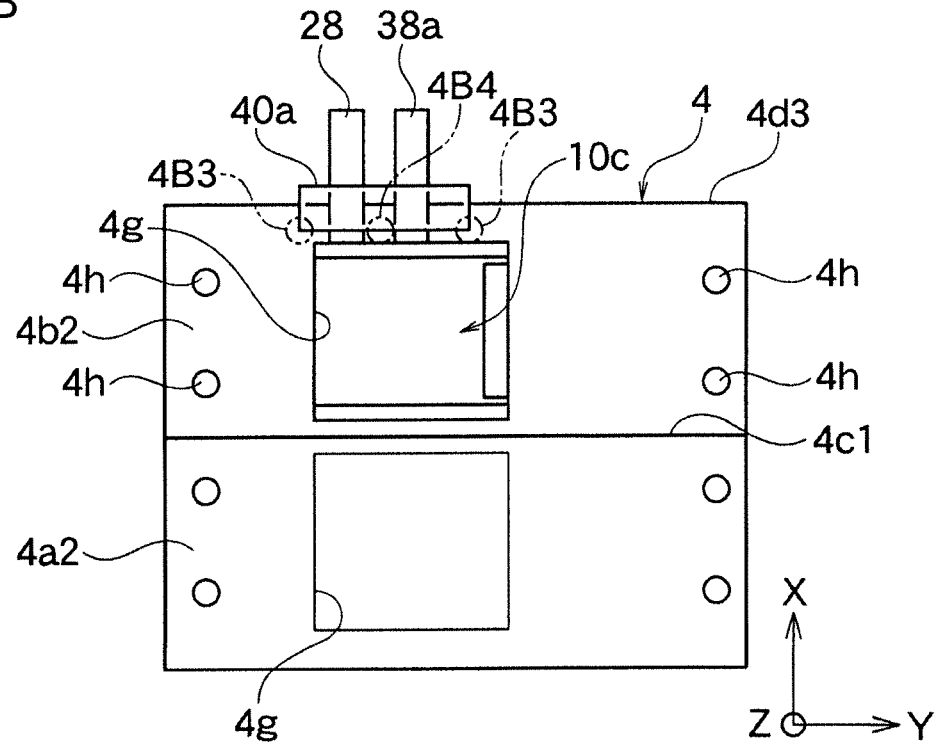
FIG. 12B is a schematic figure showing a step following FIG. 12A.

Next, as shown in FIG. 12B, the first element main body 10c is housed in the depressed part 4g formed on the inner surface of the back face sheet 4b2. At this time, the lead terminals 28 and 38a protrude out in X axis direction from the outer edge 4d3 of the back face sheet 4b2. The sealing tape 40a slightly protrudes out in X axis direction from the outer edge 4d3 of the back face sheet 4b2, and most of the protrusion part overlap and contact with the inner surface of the back face sheet 4d2.

In the present embodiment, the inner corner part (the element main body side) of the tape 40a is partially heat bonded to the inner layer 4B (see FIG. 2A) stacked on the inner surface of the sheet 4b2, thereby the heat bonded part 4B3 is formed in a spot form on the inner surface of the sheet 4b2. Alternatively, the inner side of the tape 40a positioned between the lead terminals 28 and 38a is partially heat bonded to the inner layer 4B (see FIG. 2A) stacked on the inner surface of the sheet 4b2, thereby the heat bonded part 4B4 is formed in a spot form on the inner surface of the sheet 4b2. Thereby, the element main body 10c and the lead terminals 28 and 38a are positioned and fixed against the exterior sheet 4 in a good condition, and the subsequent positioning step becomes easy.

Figure 12C:
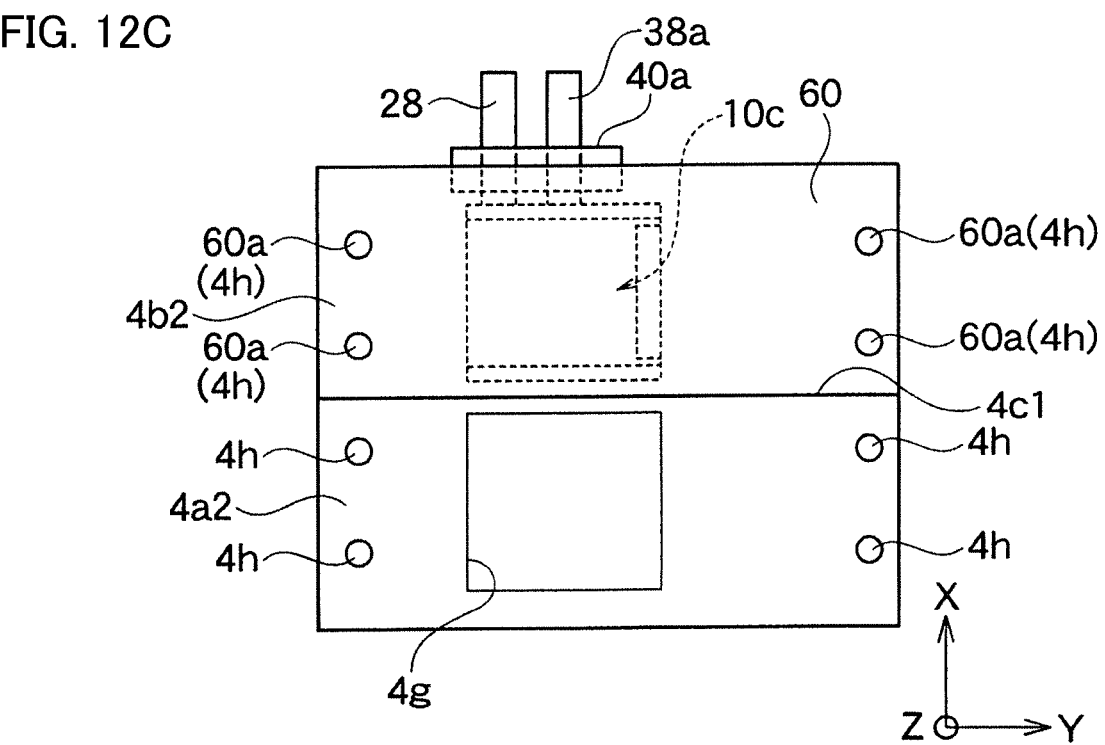
FIG. 12C is a schematic figure showing a step following FIG. 12B.

Next, as shown in FIG. 12C, the separator sheet 60 shown in FIG. 12A is stacked on the inner surface of the back face sheet 4b2 such that the first element main body 10c is covered as shown in FIG. 12B, and the positioning hole 4h of the back face sheet 4b2 and the positioning hole 60a of the separator sheet 60 are positioned against each other.

Figure 12D:
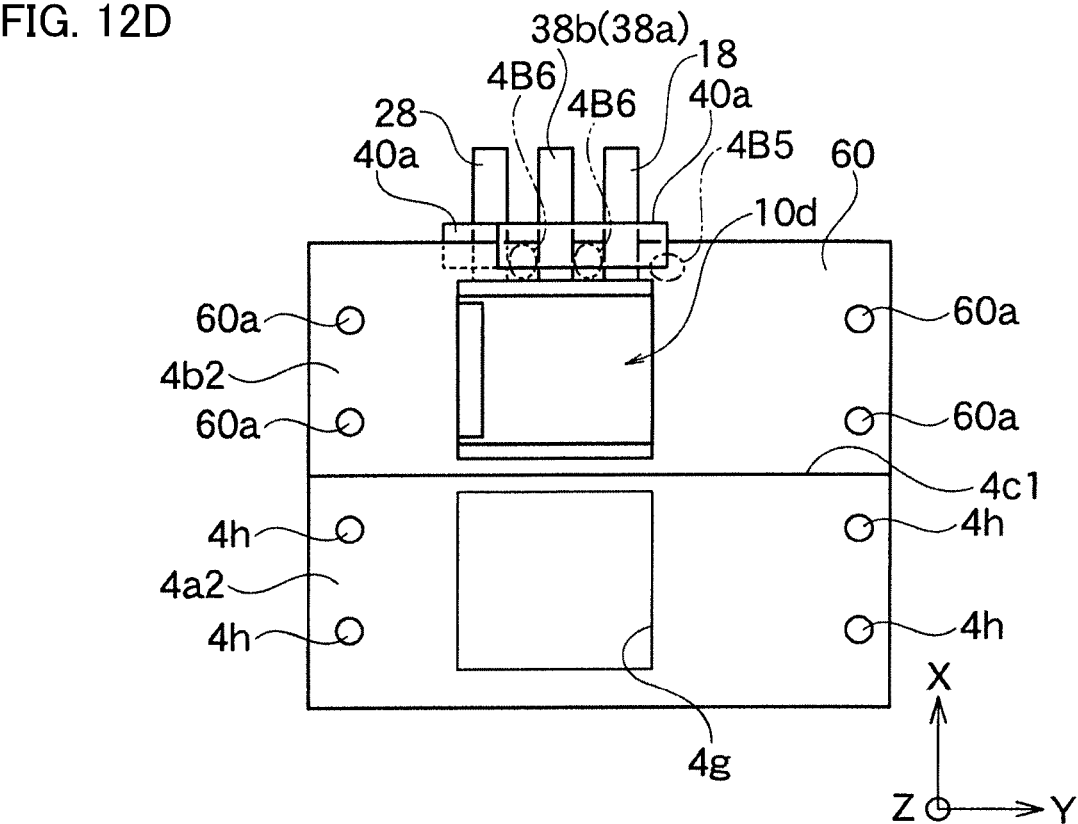
FIG. 12D is a schematic figure showing a step following FIG. 12C.

Next, as shown in FIG. 12D, the second element main body 10d is positioned against the first element main body 10c and stacked over the separator sheet 60. Particularly, it is positioned so that the lead terminal 38a of the first element main body 10c and the lead terminal 38b of the second element main body 10d are overlapping in Z axis direction.

Further, in order to prevent the shift of the position, the partial heat bonding is carried out from above the sealing tape 40a fixed to the lead terminals 18 and 38b of the second element main body 10d in a direction towards the separator sheet 60 and the inner surface of the back face sheet 4b2. The position where the partial heat bonding is carried out is not particularly limited, and for example at the inner corner part of the sealing tape 40a, the heat bonding part 4B5 is formed on the both faces of the separator sheet and the inner surface of the back face sheet 4b2.

Also, the partial heat bonding may be carried out to the inner side of the tape 40a positioned between the lead terminals 18 and 38b, and may be carried out to the inner side of the tape 40a positioned between the lead terminals 28 and 38b. In such case, the heat bonding part 4B6 is formed on the inner surface of both faces of the separator sheet 60 and the inner surface of the back face sheet 4b2. By forming these heat bonding parts 4B5 and 4B6, the lead terminals 18, 38a, 38b, and 28 of the element main bodies 10c and 10d are positioned in good condition.

Figure 12E:
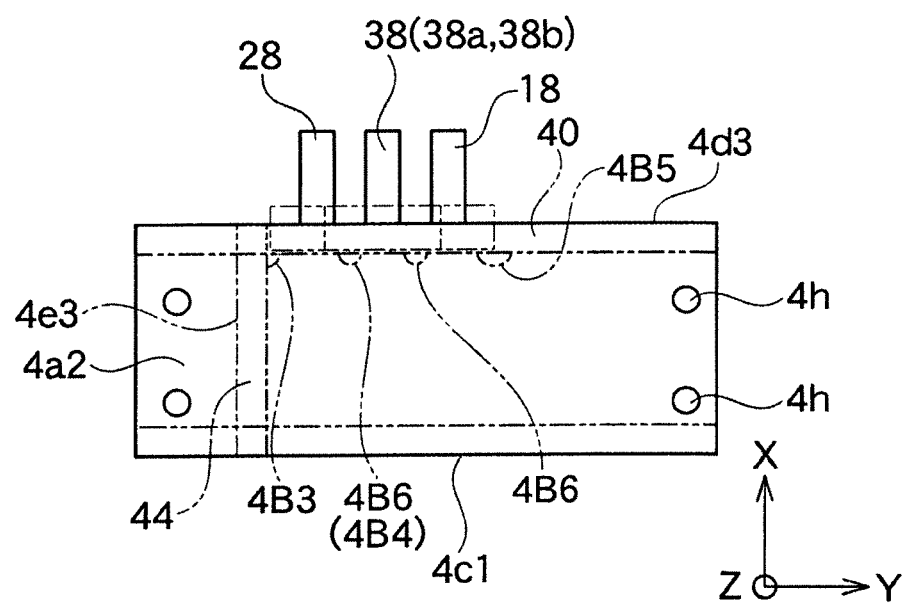
FIG. 12E is a schematic figure showing a step following FIG. 12D.

Next, as shown in FIG. 12D and FIG. 12E, the exterior sheet 4 is folded to the inner side along the folding line 4c1, and the positioning hole 60a and the positioning hole 4h are positioned so that the second element main body 10d is in the depressed part 4g. Then, the first sealing part 40 is formed by carrying out the heat press bonding while taking a certain amount of width towards the inner side from the outer edge 4d3, the second sealing part 42 is formed by carrying out the heat press bonding while taking a certain amount of width towards the inner side from the folding line 4c1, and the third sealing part 44 is formed by carrying out the heat press bonding while taking a certain amount of width towards the inner side from the outer edge 4e3.

Before forming the fourth sealing part (not shown in the figure) on the opposite side in Y axis direction of the third sealing part 44, the electrolyte is injected from the fourth sealing part into space for the first element main body and the second element main body separated by the separator sheet 60. Then, the fourth sealing part is formed and the electrolyte is sealed. Then, the extra portion in Y axis direction is removed; thereby EDLC2e shown in FIG. 11 is made. In the present embodiment, as shown in FIG. 12E, on the inner side of first sealing part 40, the traces of the heat bonding parts 4B3, 4B4, 4b5, or 4B6 is left.

Note that, the present invention is not to be limited to the embodiments mentioned in above, and can be modified variously within the scope of the present invention.

For example, the electrochemical device of a laminate type to which the present invention can be applied is not limited to only EDLC. That is, the present invention can be applied not only to EDLC but also to a lithium battery, and a lithium battery capacitor or so.

NUMERICAL REFERENCES 2, 2a, 2b, 2c, 2d, 2e, 2f . . . Electric double layer capacitor (EDLC)
4 . . . Exterior sheet
4a . . . Front face
4a1 . . . Front face sheet
4b . . . Back face
4b1 . . . Back face sheet
4c . . . Folding outer edge
4d1 . . . Outer edge of first sealing part side
4d2 . . . Outer edge of second sealing part side 4e . . . Outer edge
4/1, 4/2 . . . Support sheet
4A . . . Metal sheet
4B . . . Inner layer
4Ba . . . Heat bonding part
4B1 . . . Separator bonding part
4B2a, 4B2b . . . Tape bonding part
4C . . . Outer layer
10 . . . Element main body
11 . . . Separator sheet
12 . . . First active material layer
14 . . . First collector layer
16 . . . First internal electrode
18 . . . First lead terminal
22 . . . Second active material layer
24 . . . Second collector layer
26 . . . Second internal electrode
28, 28a . . . Second lead terminal
38 . . . Third lead terminal
40 . . . First sealing part
42 . . . Second sealing part
44 . . . Third sealing part
46 . . . Fourth sealing part
50 . . . Heat resistance insulation layer
60 . . . Separator sheet

The invention claimed is:

1. An electrochemical device comprising
an element main body formed by stacking a pair of internal electrodes and a separator sheet placed between the pair of internal electrodes,
an exterior sheet covering the element main body,
a sealing part to seal an outer edge of the exterior sheet for immersing the element main body in an electrolyte, and
a lead terminal electrically connected to one of the internal electrodes and extending to an outside from the sealing part of the exterior sheet,
wherein:
a part of the exterior sheet and a resin tape are integrated at a part of the sealing part from which the lead terminal extends, and
a tape bonding part having a spot form is formed at a position not overlapping the sealing part by partially heat bonding an inner part of the resin tape to an inner layer of the exterior sheet, the inner layer being made of resin and forming an inner surface of the exterior sheet.

2. The electrochemical device according to claim 1, wherein:
the exterior sheet comprises a front face part and a back face part, and
the inner part of the resin tape is heat bonded in a spot form on either one of the front face part or the back face part to form the tape bonding part.

3. The electrochemical device according to claim 1, further comprising a second lead terminal electrically connected to the other one of the internal electrodes and extending to an outside from the sealing part sealing the outer edge of the exterior sheet,
wherein:
the exterior sheet comprises a front face part and a back face part,
a second part of the exterior sheet and a second resin tape are integrated at a part of the sealing part from which the second lead terminal extends, and
both of the resin tape and the second resin tape are heat bonded in a spot form to the front face part or the back face part.

4. The electrochemical device according to claim 1, further comprising a second lead terminal electrically connected to the other one of the internal electrodes and extending to an outside from the sealing part sealing the outer edge of the exterior sheet,
wherein:
the exterior sheet comprises a front face part and a back face part,
a second part of the exterior sheet and a second resin tape are integrated at a part of the sealing part from which the second lead terminal extends,
the inner part of the resin tape is heat bonded in a spot form to one of the front face part or the back face part to form the tape bonding part, and
a part of the second resin tape is heat bonded in a spot form to the other one of the front face part or the back face part.

5. A method for producing the electrochemical device according to claim 1, comprising:
partially bonding the resin tape to the inner surface of the exterior sheet, the resin tape being fixed to the lead terminal that is electrically connected to one of the internal electrodes,
covering an active material layer of the internal electrodes with the separator sheet,
partially bonding a second resin tape, which is fixed to a second lead terminal electrically connected to the other one of the internal electrodes, to the inner surface of the exterior sheet so as to place the other one of the internal electrodes on the separator sheet,
covering the element main body by the exterior sheet, and
sealing the outer edge of the exterior sheet for immersing the element main body in an electrolyte,
wherein:
the part of the sealing part from which the lead terminal extends is formed by heat pressing at least part of the resin tape held by the exterior sheet, and
the resin tape is partially bonded to the inner surface of the exterior sheet prior to the heat pressing.

6. An electrochemical device comprising
a first element main body having a pair of lead terminals,
a second element main body having a pair of lead terminals different from that of the first element main body,
a separator sheet separating the first element main body and the second element main body,
an exterior sheet covering the first element main body and the second element main body separated by the separator sheet, and
a sealing part to seal an outer edge of the exterior sheet for immersing the first element main body and the second element main body in an electrolyte,
wherein:
a part of the exterior sheet and a resin tape are integrated at a part of the sealing part from which at least one of the lead terminals extends, and
a tape bonding part having a spot form is formed at a position not overlapping the sealing part by partially heat bonding an inner part of the resin tape to an inner layer of the exterior sheet, the inner layer being made of resin and forming an inner surface of the exterior sheet.

7. The electrochemical device according to claim 6, wherein at least part of the resin tape is partially heat bonded to at least one face of the separator sheet.

8. A method for producing the electrochemical device according to claim 6, comprising:

partially bonding the resin tape, which is fixed to at least one of the lead terminals of the first element main body, to the inner surface of the exterior sheet, covering the first element main body by the separator sheet, partially bonding a second resin tape, which is fixed to at least one of the lead terminals of the second element main body, to the inner surface of the exterior sheet or the separator sheet, covering the second element main body by the exterior sheet, and sealing the outer edge of the exterior sheet for immersing the first element main body and the second element main body in the electrolyte, wherein:

a part of the sealing part is formed by heat pressing the resin tape of the first element main body and the second resin tape of the second element main body held by the exterior sheet, and the resin tape of the first element main body and the second resin tape of the second element main body are partially bonded to the inner surface of the exterior sheet prior to the heat pressing.

\* \* \* \* \*